(12) United States Patent
Rovinsky

(10) Patent No.: US 11,187,507 B2
(45) Date of Patent: Nov. 30, 2021

(54) INTERCEPTION MISSILE AND WARHEAD THEREFOR

(71) Applicant: Israel Aerospace Industries Ltd., Lod (IL)

(72) Inventor: Jacob Rovinsky, Modiin (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 16/820,238

(22) Filed: Mar. 16, 2020

(65) Prior Publication Data

US 2020/0363175 A1 Nov. 19, 2020

Related U.S. Application Data

(63) Continuation of application No. 15/108,656, filed as application No. PCT/IL2015/050012 on Jan. 1, 2015, now Pat. No. 10,627,198.

(30) Foreign Application Priority Data

Jan. 1, 2014 (IL) .......................................... 230327

(51) Int. Cl.
*F42B 12/22* (2006.01)
*F42B 12/20* (2006.01)
(Continued)

(52) U.S. Cl.
CPC ............ *F42B 12/22* (2013.01); *B64C 39/024* (2013.01); *F41G 7/001* (2013.01); *F41G 7/20* (2013.01);
(Continued)

(58) Field of Classification Search
CPC ........ F42B 12/22; F42B 12/202; F42B 12/32; F42B 12/58; F42B 12/60; F42B 12/62;
(Continued)

(56) References Cited

U.S. PATENT DOCUMENTS 791,679 A * 6/1905 Edmunds ................ F42B 12/32
102/495
1,303,727 A * 5/1919 Rice ........................ F42B 12/24
148/211
(Continued)

FOREIGN PATENT DOCUMENTS

GB 2107032 A 4/1983
WO 2005079163 A2 9/2005
(Continued)

OTHER PUBLICATIONS

International Search Report and Written Opinion for PCT/IL2015/050012 dated Apr. 22, 2015.

*Primary Examiner* — John Cooper
(74) *Attorney, Agent, or Firm* — Dorsey & Whitney LLP

(57) ABSTRACT

A fragmentation warhead is provided, capable of being mounted in a carrier vehicle, the warhead having a longitudinal axis. In at least one example the warhead includes a shell that extends along the longitudinal axis. The shell includes a fixed shell portion and a fragmentation portion, and defines therebetween a cavity for accommodating therein an explosive charge. The fragmentation portion includes at least one set of serially adjacent fragments in correspondingly serially contiguous relationship in the fragmentation portion and in generally helical relationship with respect to the longitudinal axis. A corresponding carrier vehicle and a corresponding missile are also provided.

20 Claims, 25 Drawing Sheets

(51) Int. Cl.
  *F42C 19/095* (2006.01)
  *F42B 12/32* (2006.01)
  *B64C 39/02* (2006.01)
  *F41G 7/00* (2006.01)
  *F41G 7/20* (2006.01)
  *F42B 10/26* (2006.01)

(52) U.S. Cl.
  CPC ............ *F42B 12/202* (2013.01); *F42B 12/32* (2013.01); *F42C 19/095* (2013.01); *B64C 2201/121* (2013.01); *F42B 10/26* (2013.01)

(58) Field of Classification Search
  CPC . F42B 10/26; B64C 39/024; B64C 2201/121; F41G 7/001; F41G 7/20; F42C 19/095
  USPC .......... 89/1.11; 102/497, 389, 475, 478, 493, 102/494, 495
  See application file for complete search history.

(56) References Cited

U.S. PATENT DOCUMENTS

| | | | | |
|---|---|---|---|---|
| 2,925,965 | A * | 2/1960 | Pierce | F42C 19/095 89/135 |
| 3,298,308 | A * | 1/1967 | Throner, Jr. | F42B 12/32 102/496 |
| 3,566,749 | A | 3/1971 | Allen et al. | |
| 3,566,794 | A | 3/1971 | Pearson et al. | |
| 3,580,175 | A | 5/1971 | Kenney et al. | |
| 3,594,882 | A | 7/1971 | Lovell | |
| 3,720,168 | A | 3/1973 | Sylwester | |
| 3,799,054 | A * | 3/1974 | Rocca | F42B 12/22 102/491 |
| 3,853,060 | A * | 12/1974 | Weeding | F42B 12/204 102/495 |
| 4,026,213 | A * | 5/1977 | Kempton | F42C 19/095 102/475 |
| 4,093,153 | A | 6/1978 | Bardash et al. | |
| 4,216,720 | A * | 8/1980 | Kempton | F42B 12/32 102/494 |
| 4,305,333 | A | 12/1981 | Altenaue et al. | |
| 4,327,643 | A * | 5/1982 | Lasheras Barrios | F42B 12/32 102/473 |
| 4,516,501 | A * | 5/1985 | Held | F42B 12/22 102/275.5 |
| 4,648,323 | A * | 3/1987 | Lawther | F42B 12/32 102/495 |
| 4,655,139 | A * | 4/1987 | Wilhelm | F42C 19/095 102/309 |
| 4,848,239 | A * | 7/1989 | Wilhelm | F42B 12/22 102/492 |
| 4,899,661 | A * | 2/1990 | Kaelin | F42B 12/28 102/495 |
| 5,050,503 | A | 9/1991 | Menz et al. | |
| 5,157,225 | A * | 10/1992 | Adams | F42B 12/24 102/493 |
| 5,182,418 | A * | 1/1993 | Talley | F42C 19/095 102/211 |
| 5,313,890 | A * | 5/1994 | Cuadros | F42B 12/32 102/393 |
| 6,209,820 | B1 * | 4/2001 | Golan | F41G 7/2206 244/3.1 |
| 6,931,994 | B2 * | 8/2005 | Lloyd | F42B 12/205 102/489 |
| 6,961,113 | B1 | 11/2005 | Hayashi et al. | |
| 6,962,113 | B1 * | 11/2005 | Carlson | F42B 12/22 102/389 |
| 7,621,222 | B2 * | 11/2009 | Lloyd | F42B 12/24 102/497 |
| 7,624,682 | B2 * | 12/2009 | Lloyd | F42B 12/06 102/497 |
| 7,743,707 | B1 * | 6/2010 | Melin | F42B 12/24 102/493 |
| 7,977,614 | B2 | 7/2011 | Raviv | |
| 9,683,822 | B2 * | 6/2017 | Kerns | F42B 33/001 |
| 2003/0019386 | A1 * | 1/2003 | Lloyd | F42B 12/205 102/494 |
| 2004/0074413 | A1 | 4/2004 | Ronn et al. | |
| 2005/0077424 | A1 | 4/2005 | Schneider | |
| 2005/0109234 | A1 * | 5/2005 | Lloyd | F42B 12/60 102/497 |
| 2006/0238403 | A1 * | 10/2006 | Golan | F41G 7/303 342/62 |
| 2011/0146523 | A1 * | 6/2011 | Kim | F42B 12/22 102/494 |
| 2015/0143982 | A1 * | 5/2015 | Rovinsky | G01S 7/003 89/1.11 |
| 2016/0320165 | A1 | 11/2016 | Rovinsky | |

FOREIGN PATENT DOCUMENTS

| | | |
|---|---|---|
| WO | 2010125569 A1 | 11/2010 |
| WO | 2013105093 A1 | 7/2013 |
| WO | 2014072973 A1 | 5/2014 |

\* cited by examiner

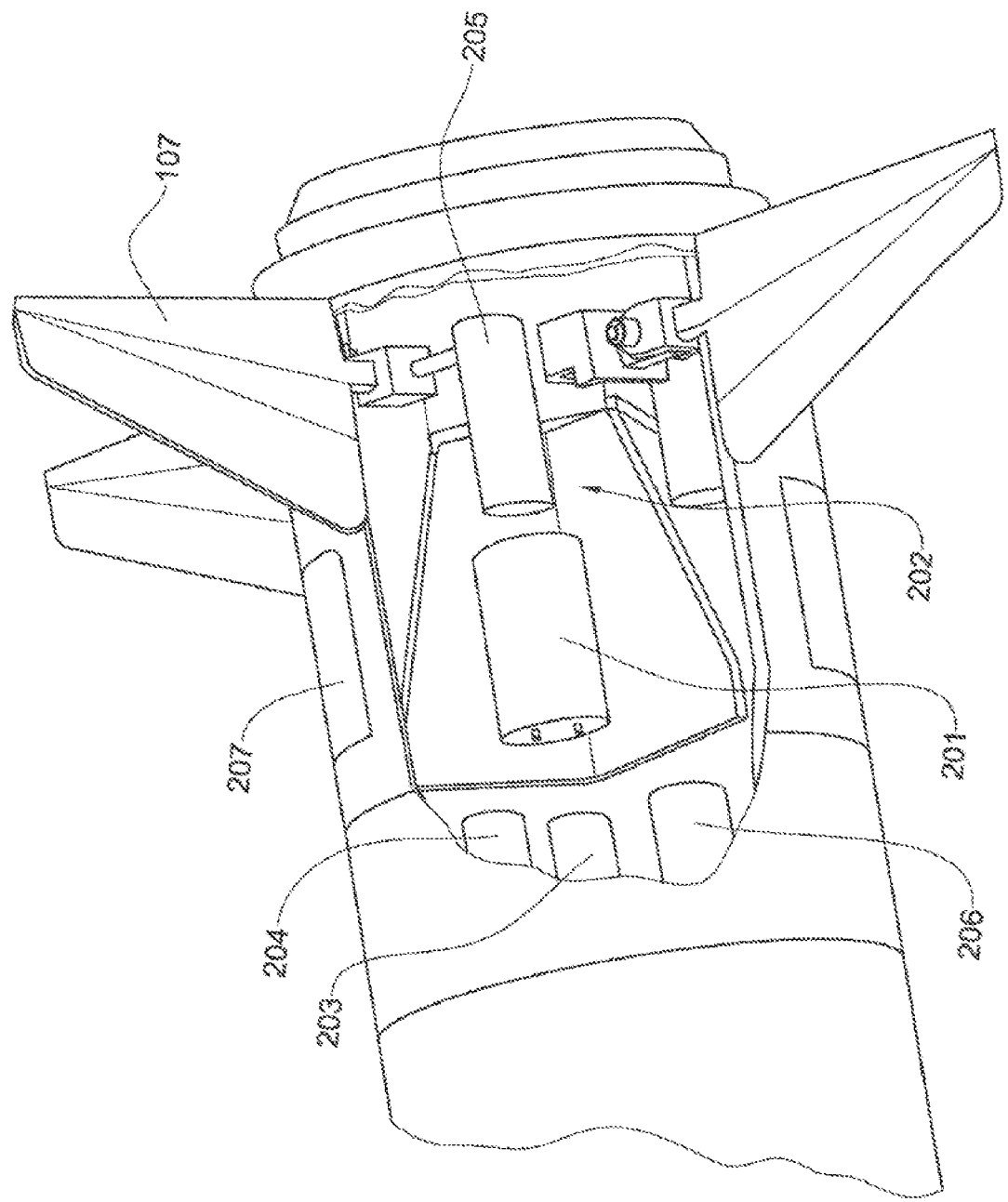

INTERCEPTION MISSILE AND WARHEAD THEREFOR

TECHNOLOGICAL FIELD

The presently disclosed subject matter relates to interception missiles and warheads therefor, and to systems and methods using such missiles.

PRIOR ART

References considered to be relevant as background to the presently disclosed subject matter are listed below:
WO 2013/105093
WO 2006/238403
U.S. Pat. No. 4,093,153
U.S. Pat. No. 7,977,614
U.S. Pat. No. 6,209,820
WO 2010/125569
US 2005/077424

Acknowledgement of the above references herein is not to be inferred as meaning that these are in any way relevant to the patentability of the presently disclosed subject matter.

BACKGROUND

Ground to Ground (GTG) rockets such as the GRAD are a serious threat when hitting a civil populated territory.

The simple conventional GTG rocket structure has a clear inherent advantage of very simple launching means and a low-cost price tag, facilitating deployment of numerous launchers and utilization of numerous rockets which can be launched in large numbers and over a long period of time towards a desired territory, causing not only damage in property, injury and loss of life, but also substantial damage to the morale of the population which is subjected to prolonged and continuous threats.

Recently a new anti-rocket system called the "IRON DOME" system (provided by RAFAEL, Israel) has been introduced and used by the Israel Defense Forces (IDF) for protecting various towns that have been targeted by GRAD and other rockets, launched from the Gaza Strip.

A significant challenge in the interception of GTG rockets relates to the lethality problem: the vulnerable area of the rocket has relatively small dimensions and is surrounded by one or two layers of steel-made balls fitted onto the warhead explosive. Achievement of lethal interception is possible by using the hit-to-kill technique or by hitting of the threat's warhead by the very dense beam of relatively heavy fragments (e.g. known per se tungsten fragments of at least 35-40 grams).

Usage of hit-to-kill techniques for interception of spinning rockets appears to be problematic due to precession movement of the rocket with unpredictable amplitudes. On the other hand, the killing mechanism based on a fragmentation warhead requires a relatively large number of heavy fragments accelerated to required velocity to achieve the lethal effect. Dimensions and weight of the warhead directly influence the size, weight, and cost of the interception missile. The number of required lethal fragments generally depends on the volume of uncertainty regarding the position of the threat relative to the interception missile during the end game. The conventional approach for reducing this uncertainty volume is by using different on-board sensors such as for example RF seekers or electro-optical sensors. Another approach for reducing the uncertainty volume is disclosed in WO 2013/105093. This publication, by way of general background, discloses a counter-flying object system comprising a sensor array including at least one active sensor and at least two passive sensors configured to detect and track the flying object, and a missile launcher configured to launch an interceptor to intercept the flying object, wherein upon launching the interceptor, the sensor array is configured to determine the location of the interceptor and the flying object and send said object and interceptor locations to a control system, the control system being configured to provide mission data to the interceptor based on said object and interceptor locations for guiding the interceptor toward the flying object and activating a fragmentation warhead on or in the vicinity of the flying object when a lethality criteria is met.

Conventionally, such constraints compel utilization of a sophisticated and costly defense system, for defending against a comparatively simple and low-cost rocket launch system.

The contents of the above references are incorporated herein in their entirety.

GENERAL DESCRIPTION

According to a first aspect of the presently disclosed subject matter, there is provided a fragmentation warhead configured for being mounted in a carrier vehicle, the warhead having a longitudinal axis and comprising:
  a shell extending along said longitudinal axis and comprising a fixed shell portion and a fragmentation portion, and defining therebetween a cavity for accommodating therein an explosive charge;
  the fragmentation portion comprising at least one set of serially adjacent fragments in correspondingly serially contiguous relationship in the fragmentation portion and in generally helical relationship with respect to the longitudinal axis.

For example, the fragmentation portion is configured for fragmenting into said at least one set of serially adjacent fragments in generally helical relationship with respect to the longitudinal axis, in response to detonation of the explosive charge.

According to the first aspect of the presently disclosed subject matter, there is also provided a fragmentation warhead configured for being mounted in a carrier vehicle, the warhead having a longitudinal axis and comprising:
  a shell extending along said longitudinal axis and comprising a fixed shell portion and a fragmentation portion, and defining therebetween a cavity for accommodating therein an explosive charge;
  the fragmentation portion configured for fragmenting into at least one set of serially adjacent fragments in generally helical relationship with respect to the longitudinal axis, in response to detonation of the explosive charge.

For example, prior to said detonation, said at least one set of serially adjacent fragments are correspondingly serially contiguous relationship in said fragmentation portion and in generally helical relationship with respect to the longitudinal axis.

Additionally or alternatively, the fragmentation portion is configured for fragmenting into a plurality of laterally adjacent said sets of serially adjacent fragments in generally helical relationship with respect to the longitudinal axis, in response to detonation of the explosive charge.

Additionally or alternatively, the fragmentation portion is configured for fragmenting into three laterally adjacent said sets, each said set comprising between 30 and 50 said serially adjacent fragments in generally helical relationship with respect to the longitudinal axis, in response to detonation of the explosive charge.

Additionally or alternatively, said fixed shell portion is configured so that upon initiation of detonation of the explosive charge, shockwaves propagating therefrom are directed via said fixed shell portion the towards said fragmentation portion.

Additionally or alternatively, said fixed shell portion has rotational symmetry about said longitudinal axis.

Additionally or alternatively, said fixed shell portion has a generally tubular configuration.

Additionally or alternatively, each said set of serially adjacent fragments in correspondingly serially contiguous relationship in said fragmentation portion and in generally helical relationship with respect to the longitudinal axis is oriented at predetermined helix angle with respect to said longitudinal axis. For example, said helix angle is predetermined such that upon said detonation, the respective said fragments of each said set are spread over an imaginary cylindrical surface along a distance of between about 2 m to about 4 m over said cylindrical surface, at a corresponding radial distance of between 4 m and 8 m, respectively, from said longitudinal axis, while ensuring a spacing of not greater than 0.1 m between adjacent fragments at said radial distance. For example, said helix angle is between 2.5° and 3°.

Additionally or alternatively, said fragmentation portion is formed as a plurality of axially serially adjacent fragmentation portion sections, each said fragmentation portion section comprising a plurality of said fragments in lateral contiguous (abutting) relationship, and wherein said plurality of fragments of each successive said fragmentation portion section along said longitudinal axis is angularly displaced about the longitudinal axis with respect to the respective said plurality of fragments of the previous said fragmentation portion section. For example, a respective said plurality of fragments of a first said fragmentation portion section at one longitudinal end of said fragmentation portion is angularly displaced about the longitudinal axis with respect to a respective said plurality of fragments of a last said fragmentation portion section at another longitudinal end of said fragmentation portion by an angular displacement of between 25° and 35°. For example, the respective said plurality of fragments of each pair of successive said fragmentation portion sections are angularly displaced from one another with reference to (along) a plane orthogonal to the longitudinal axis by a fragmentation set dispersion angle. For example said fragmentation set dispersion angle is between 0.5° and 0.7°.

Additionally or alternatively, said fragmentation portion is formed as a generally helical band with respect to said longitudinal axis, and wherein said fixed shell portion comprises a generally helical slot complementary to said helical band. For example, said generally helical band is projectable to a plane to provide a two dimensional parallelogram pattern of said fragments. For example, said parallelogram pattern having a base corresponding to the width of three said fragments, and a height corresponding to the axial length of the fragmentation warhead. For example, each said fragment has a weight of between 25 g and 35 g.

Additionally or alternatively, said fragmentation portion contains a total number of said fragments between 100 said fragments and 200 said fragments.

Additionally or alternatively, said fragmentation portion contains a total number of said fragments having an aggregate weight of between 3.5 Kg and 4.5 Kg.

Additionally or alternatively, each said fragment has a plan shape in the form of a parallelogram.

Additionally or alternatively, following detonation of the explosive charge, said fragments of each said set are serially spaced at a spacing between each adjacent pair of said fragments less than a diameter of a GRAD rocket warhead at a distance less than 7.5 m from said longitudinal axis.

Additionally or alternatively, following detonation of the explosive charge, said fragments of each said set are serially spaced at a spacing less than 0.1 m at a distance between 4.5 m and 7.5 m from said longitudinal axis.

Additionally or alternatively, following detonation of the explosive charge, each said set of fragments is spaced from an adjacent said set of fragments at a spacing less than an axial length of a GRAD rocket warhead at a distance less than 7.5 m from said longitudinal axis.

Additionally or alternatively, following detonation of the explosive charge, each said set of fragments is spaced from an adjacent said set of fragments at a spacing less than 0.50 m at a distance between 4.5 m and 7.5 m from said longitudinal axis.

Additionally or alternatively, each said fragment is capable of neutralizing a flying object by impacting a kill zone thereof. For example, said kill zone has a length of 0.50 m and a width of 0.10 m. For example, said flying object is any one of: a rocket, a GRAD rocket, a UAV, a manned aircraft, a cruise missile.

According to the first aspect of the presently disclosed subject matter, there is also provided a carrier vehicle for a fragmentation warhead, comprising:
   the fragmentation warhead as defined above for this aspect of the presently disclosed subject matter;
   an uplink for receiving commands from a control;
   a proximity fuse operatively connected to the fragmentation warhead and configured for detonating the warhead at a predetermined spacing between the carrier vehicle and a flying object;
   the carrier vehicle being maneuverable at least responsive to receiving said commands.

For example, the carrier vehicle is configured for being mounted in a booster stage.

For example, said proximity fuse is configured for generating two flat laser beams and for fusion time determination based on reflections received from said beams.

For example, said longitudinal axis is parallel to a longitudinal axis of the carrier vehicle.

For example, said uplink comprises a receiver for receiving data or signals relating to PIP, target and carrier vehicle state vectors, and/or relative state vectors between target and carrier vehicle.

For example, the carrier vehicle comprises a plurality of pivotable vanes for steering (maneuvering) said carrier vehicle.

For example, the carrier vehicle further comprises a homing sensor, configured for autonomously homing onto a target.

According to the first aspect of the presently disclosed subject matter, there is also provided a missile for intercepting a flying object, comprising:
   (a) a carrier vehicle for a fragmentation warhead as defined above for this aspect of the presently disclosed subject matter and
   (b) a booster stage for propelling the carrier vehicle along a desired trajectory.

For example, said booster stage is based on a GRAD rocket system or wherein said booster stage comprises a GRAD rocket motor.

According to the first aspect of the presently disclosed subject matter, there is also provided an interception system comprising:
- a missile battery including at least one missile for intercepting a flying object as defined above for this aspect of the presently disclosed subject matter;
- a radar system for detecting and tracking at least one said flying object;
- a computer system for determining a predicted impact point (PIP) for the missile;
- a communications uplink to provide maneuvering data to the carrier vehicle during flight thereof to intercept the respective said flying object at the respective predicted interception point PIP.

For example, the system is configured for causing the carrier vehicle to be selectively oriented at a desired relative angle to a flight path of the flying object at the predicted interception point (PIP).

For example, said relative angle is between 10° and 12°, or wherein said relative angle is between −20° to +40° when in pursuit interception scenario, or wherein said relative angle is between +160° to +220° for head on interception scenario.

According to the first aspect of the presently disclosed subject matter, there is also provided a method for intercepting a flying object, comprising:
(i) providing a missile as defined above for this aspect of the presently disclosed subject matter;
(ii) using the booster stage to selectively launch the carrier vehicle along an intercept trajectory with respect to the flying object;
(iii) maneuvering the carrier vehicle into proximity with the flying object;
(iv) detecting the flying object within a minimum range with respect to the fragmentation warhead via the proximity fuse; and
(v) detonating the explosive charge responsive to step (iii).

For example, in step (iii) the carrier vehicle is oriented at a relative angle to the flying object at a predicted interception point (PIP).

For example, said relative angle is between 10° and 12°, or wherein said relative angle is between −20° to +40° when in pursuit interception scenario, or wherein said relative angle is between +160° to +220° for head on interception scenario.

For example, the method includes providing a spacing between the carrier vehicle and the flying object of between 4.5 m and 7.5 m at the PIP, and/or wherein the fragmentation portion is facing the flying object at the PIP According to the first aspect of the presently disclosed subject matter, there is also provided an interception missile comprising a fragmentation warhead and configured for being maneuvered to a predicted interception point (PIP) for intercepting within a probability envelope a flying object having a kill zone of known dimensions, the fragmentation warhead being configured for selectively providing a plurality of fragments directed towards said probability envelope such that the spacing between any two adjacent said fragments within the probability envelope is less than at least one of said known dimensions to ensure that at least one said fragment impacts said kill zone within said probability envelope, wherein each said fragment is capable of neutralizing the flying object by impacting said kill zone.

For example, said kill zone has a length of 0.50 m and a width of 0.10 m.

For example, said flying object is any one of: a rocket, a GRAD rocket; a UAV, a manned air vehicle, cruise missile.

According to the first aspect of the presently disclosed subject matter, there is also provided a fragmentation warhead configured for being mounted in a carrier vehicle, the warhead having a longitudinal dimension along a longitudinal axis and configured for selectively providing a plurality of fragments directed towards a target area spaced at an interception spacing from said warhead to provide a fragmentation pattern on the target area including at least one set of said fragments in a spaced linear relationship extending to a length dimension greater than said longitudinal dimension, wherein adjacent said fragments in each said set at the target area are spaced at a respective fragmentation spacing that is within the dimensions of a kill zone of an intended target, wherein each said fragment is capable of neutralizing the intended target by impacting said kill zone.

For example, said kill zone has a length of 0.50 m and a width of 0.10 m.

For example, said flying object is any one of: a rocket, a GRAD rocket; a UAV, a manned air vehicle, cruise missile.

BRIEF DESCRIPTION OF THE DRAWINGS

In order to better understand the subject matter that is disclosed herein and to exemplify how it may be carried out in practice, several examples will now be described, by way of non-limiting examples only, with reference to the accompanying drawings, in which:

FIGS. 3A, 3B illustrate schematically the aft portion of the carrier vehicle of the example of FIG. 1.

DETAILED DESCRIPTION OF THE FIGURES

Figure 1:
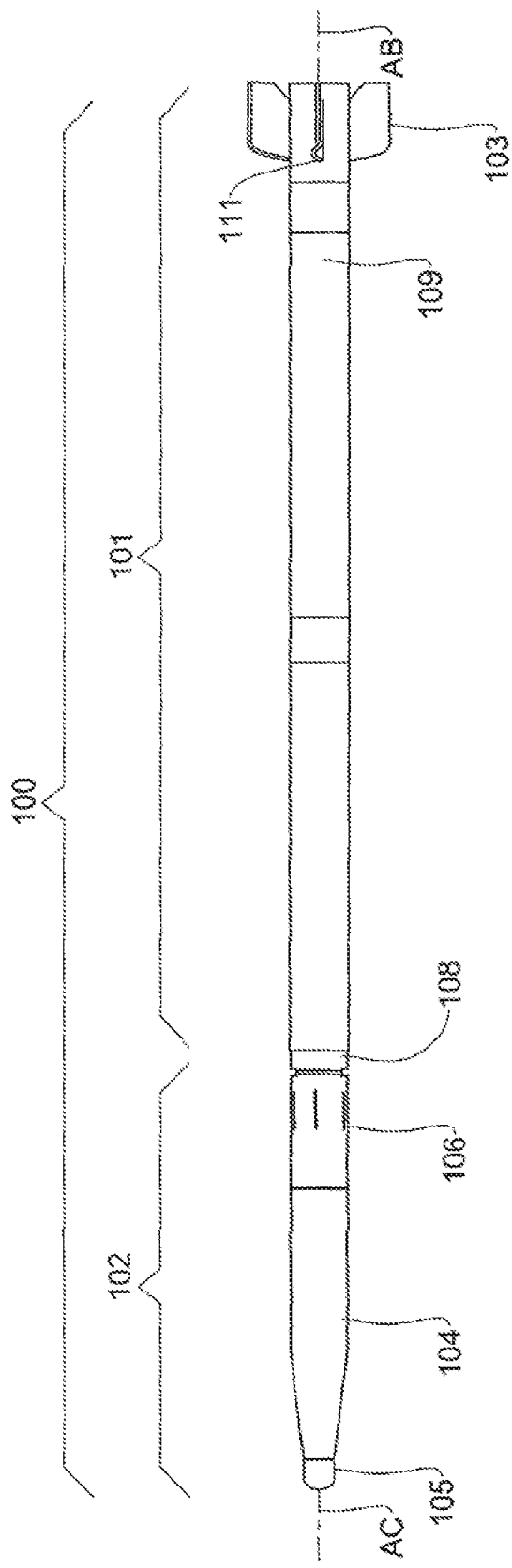
FIG. 1 is a schematic representation illustrating in side view an interception missile according to an example of the presently disclosed subject matter.

Referring to FIG. 1, an interception missile (for example, for intercepting a flying object) according to a first example of the presently disclosed subject matter is generally designated with reference numeral 100, and comprises a carrier vehicle 102 for a fragmentation warhead, and a booster stage 101.

The booster stage 101 is configured for launching and propelling the carrier vehicle 102 along a desired trajectory, and comprises a suitable propulsion system (not shown). While at least in this example the propulsion system comprises a solid fuel rocket motor and solid propellant accommodated within the external casing 109, in alternative variations of this example the propulsion system can instead or additionally include one or more liquid fuel rocket engines, for example. The booster stage 101 further comprises a plurality of fins 103 for stabilizing the missile 100, for example during the boost and/or coast phases of the flight, and until the carrier vehicle 102 separates from the booster stage 101. In this example, the fins 103 are configured as wrap-around fins, being deployable from a stowed configuration to a deployed configuration. In the stowed configuration the fins are wrapped around the periphery of the aft section 111 of the booster stage 101, providing a compact geometry, which can be useful for storage and/or for launching the missile 100 from a launch tube of internal diameter slightly greater than the maximum outer diameter of the missile 100. In the deployed configuration (as illustrated in FIG. 1) the fins 103 are projecting outwardly, generally radially with respect to the longitudinal axis AB of the booster stage 101. In alternative variations of this example, different stabilizing systems can be used, for example fixed fins.

The forward end 108 of the booster stage 101 is configured for enabling the carrier vehicle 102 to be releasably mounted thereto, for example via explosive bolts.

In operation, the booster stage 101 serves to boost the missile 100 to acquire maximum kinetic energy to propel the missile along a desired trajectory, and to increase the ballistic coefficient of the missile 100 during the coasting phase. Stage separation then occurs between the carrier vehicle 102 and the booster stage 101, in which the booster stage 101 is discarded, and the carrier vehicle continues along a guided trajectory to the predicted interception point (PIP). In at least this example the missile 100 is not initially guided, but rather is launched with an initial azimuth and elevation that is calculated to bring the carrier vehicle into proximity with the PIP, and guidance is provided only after stage separation.

In this example, the booster stage 101 is based on a GRAD type rocket, which is already developed and mass-produced. For example, the booster stage 101 can include at least a part of such a GRAD type rocket, suitably modified if necessary to allow for the mounting of, and subsequently to the selective separation of, the carrier vehicle 102. In such examples, the unit cost of each booster stage 101 is comparatively low, as compared with the unit cost of a booster stage that is developed specifically for use with the carrier vehicle 102. As will become clearer below, this feature of utilizing a GRAD type rocket for providing the booster stage 101 contributes to minimizing the economic unit cost of each missile 100, so that in at least some examples, such a unit cost can be comparable to, i.e., at least within the same order of magnitude as, the unit costs of GRAD type rockets that are intended to be intercepted and neutralized by the missile 100. Furthermore, in at least some examples the missile 100 can be launched using launchers designed for regular GRAD type rockets, thereby reducing costs of operation even further.

By neutralizing an object is meant herein to refer to destroying the object, or to otherwise render the object ineffective, or to at least significantly reduce the lethality of the object.

GRAD type rockets are well known in the art and can be defined as a MLRS (multiple launch rocket system) class of rockets that are mass produced as rockets that have a relative low economic unit cost.

An example of such a GRAD type rocket is the M-21OF rocket, produced in Russia, and typically launched from a BM-21 launch vehicle that includes a multiple rocket launcher. Some examples of such a GRAD type missile have an external diameter of 122 mm, length 2.8 m, take-off weight of about 70 Kg including a payload (warhead) weight of about 19 Kg; some variants have a ground-to-ground range of about 12 km, while others have a 20 km range. Improved variants of GRAD rockets have range of about 40 km.

Figure 2:
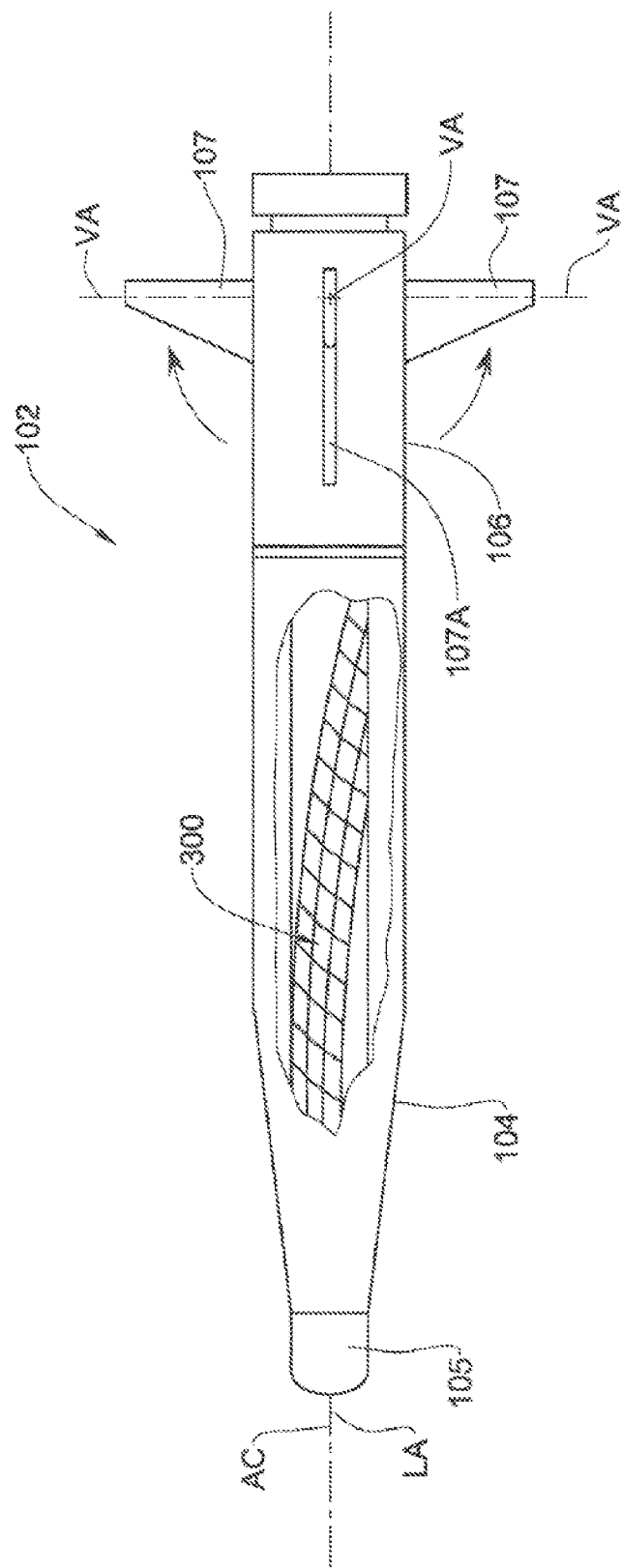
FIG. 2 shows in partially fragmented view the carrier vehicle of the interception missile of the example of FIG. 1.

Referring also to FIG. 2, the carrier vehicle 102 comprises a warhead module 104, proximity fuse 105, and aft module 106.

The proximity fuse 105 in this example comprises a laser detector, which generates two laser beams, angularly displaced from one another with respect to the axis AC, and a laser detector for detecting reflected laser beams. Each laser beam is formed as a flat beam. The proximity fuse 105 is configured for fusion time determination based on reflections received from the laser beams. The proximity fuse 105 operates (directly or via a mission computer) to detonate the explosive charge 360 at a calculated time interval after a flying object crosses both beams, as will become clearer below. In any case proximity fuses are well known in the art, and include, for example proximity sensors provided by L3 (USA), or any other suitable range finder systems based on LADAR or radar techniques. In alternative variations of this example, different types of proximity fuses may be used, mutatis mutandis.

Referring also to FIG. 3A, the aft module 106 comprises a battery 201, steering system 202, navigation system 203, and communication system 204.

Figure 3B:
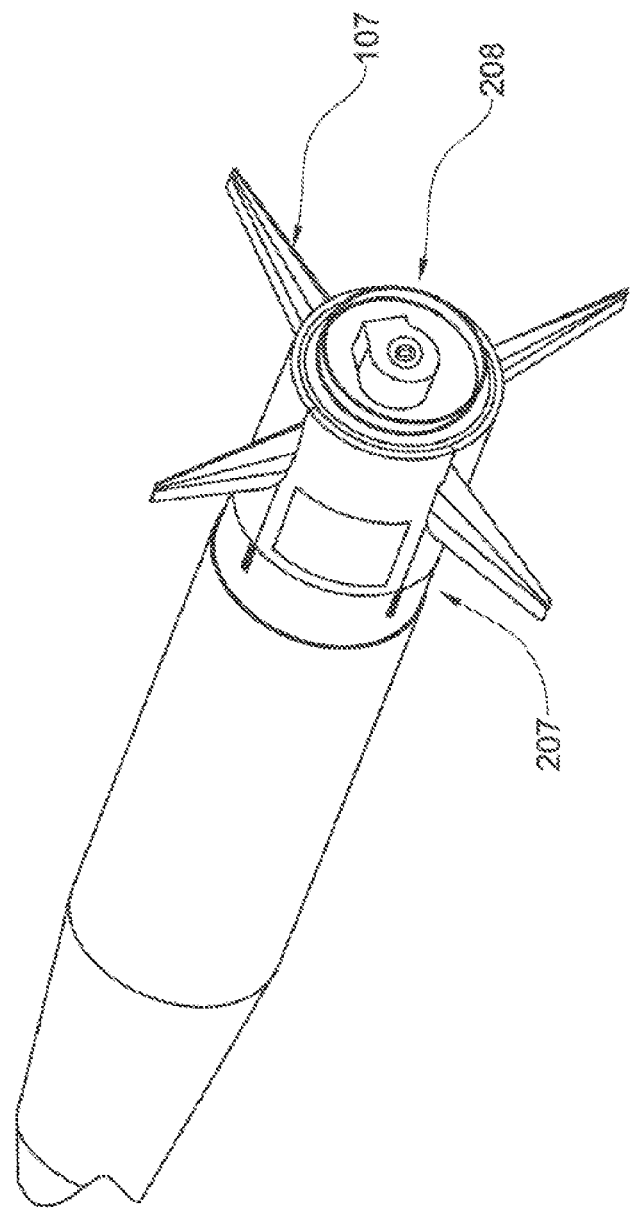

The steering system 202 includes drivers (not shown), actuators 205, and steering fins 107. In this example, the fins 107 are pivotably mounted to the aft module 106, being deployable from a stowed configuration to a deployed configuration. In the stowed configuration (see for example FIG. 1) the fins 107 are accommodated in axial slots 107A (FIG. 2) provided in the aft module 106. In the deployed configuration (as illustrated in FIGS. 2, 3A, 3B), the fins 107 are pivoted out of their respective slots to project radially with respect to the longitudinal axis AC of the carrier vehicle 102. Once deployed, the fins can be pivoted about respective axes VA that radially project from longitudinal axis AC of the carrier vehicle 102 to provide one or more of pitch control moments, roll control moments, and yaw control moments with respect to the longitudinal axis AC of the carrier vehicle 102. In alternative variations of this example, different steering systems can be used, for example foldable pivotable fins (e.g. wrap-around pivotable fins) or permanently deployed pivotable fins.

The navigation system 203 includes airborne computer 206 and an inertial unit (not shown) configured for measuring angular displacement to determine the spatial orientation of the missile 100, and in particular of the carrier vehicle 102 with respect to three orthogonal axes (for example the pitch roll and yaw axes of the carrier vehicle 102). Optionally, the navigation system 203, in particular the inertial unit, can comprise accelerometers along each of the three orthogonal axes for increasing accuracy of the determination of the missile spatial location, in particular for increasing accuracy of the determination of the spatial location (and spatial orientation) of the carrier vehicle 102, with reference to the three orthogonal axes, between sequential uplink communications.

The airborne computer 206 is configured for performing a number of tasks including at least the following:
  guidance task for guiding the carrier vehicle 102 to a predicted interception point (PIP);
  navigation task for determining the spatial position and spatial orientation of the carrier vehicle 102 during flight;
  control task for close loop control of the steering mechanism, including providing a desired spatial orientation of the carrier vehicle 102 at the PIP;
  activation of stage separation between the carrier vehicle 102 and the booster stage 101;
  activation of the warhead 104 including the proximity fuse 105.

The communication system 204 includes uplink receiver (not shown) and antenna 207, for providing updated control commands or information to the missile 100, and in particular to the carrier vehicle 102, during flight.

Figure 3C:
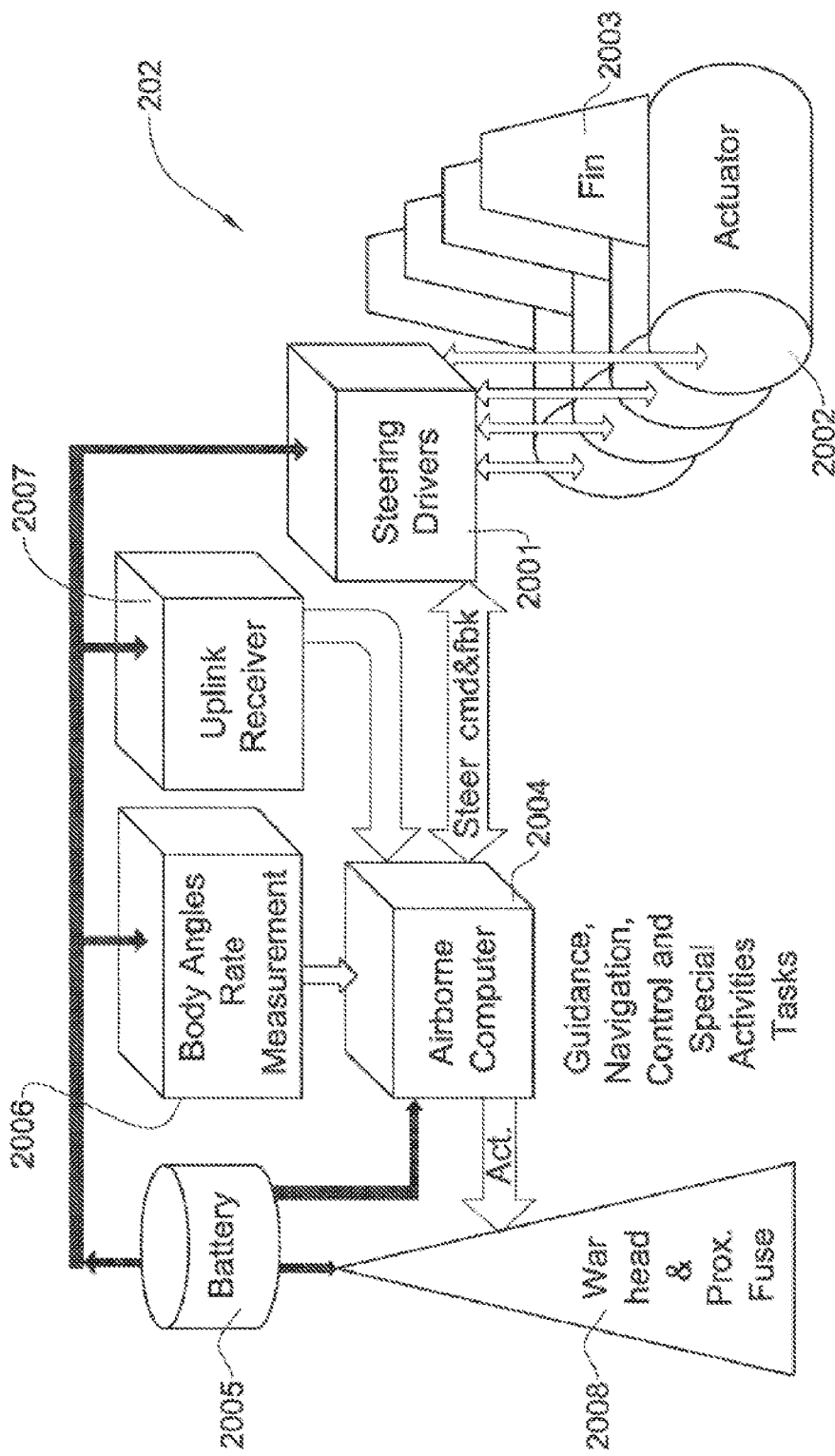
FIG. 3C illustrates airborne main section system architecture, in accordance with certain examples.

Referring to FIG. 3C, an airborne main system architecture is illustrated in accordance with at least some examples of the presently disclosed subject matter, in which the steering system 202 includes drivers 2001 configured to command actuators 2002 for actuating steering fins 2003 (for example fins 107), as known per se. Airborne computer 2004 (forming part of the navigation system) is powered by battery 2005 and receives feedback indicative of the steering fins 2003 (by means of the steering drivers 2001) and the body angle rate measurements module 2006 (forming part of navigation system) determining an angular position of the carrier vehicle 102 in three mutually orthogonal axes. The airborne system further receives inputs through the uplink receiver 2007 and associated antenna (forming part of the communication system from main external source (for example ground sensors) for updating the carrier vehicle 102 during flight. The airborne computer 2004 processes all these data for:
  (i) guidance task for diverting or otherwise guiding the carrier vehicle 102 towards the PIP by generating steering commands that are sent to the steering fins 2003 through the steering drivers;
  (ii) navigation tasks for determining the spatial position and spatial orientation of the carrier vehicle 102 during the flight (based on the angle rate measurement module 2006);
  (iii) control task for close loop control of the steering mechanism, including providing a desired spatial orientation of the carrier vehicle 102 at the PIP;
  (iv) activation of stage separation between the carrier vehicle 102 and the booster stage 101;
  (v) activation of the warhead including the proximity fuse 2008 (for example fuse 105).

It is to be noted that the presently disclosed subject matter is not bound by the specified system architecture.

In operation, the airborne computer 2004 receives updated navigation data from the on board inertial measurement unit and from an external measurement of the location of the carrier vehicle by the uplink communication channel (using the uplink receiver 2007 of communication system).

In accordance with at least certain examples, the guidance rules which control the steering of the carrier vehicle 102 towards the PIP can comply (but not necessarily) for example with a known per se proportional navigation paradigm.

Figure 4:
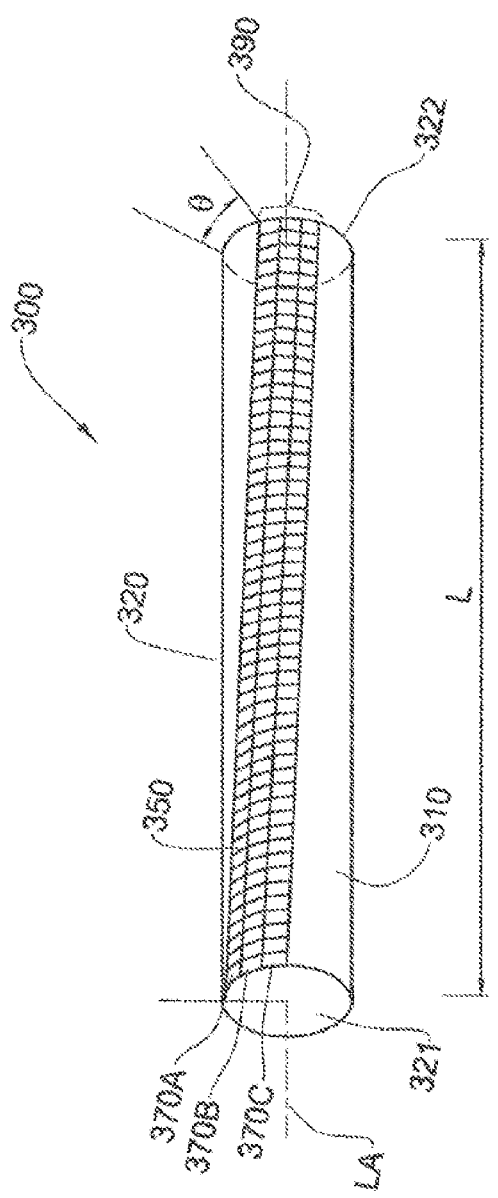
FIG. 4 shows in isometric view a fragmentation warhead of the example of FIG. 1

Referring to FIGS. 2 and 4, the warhead module 104 accommodates fragmentation warhead 300.

Thus, fragmentation warhead 300 is configured for being mounted in the carrier vehicle 102. The fragmentation warhead has a longitudinal axis LA, which in this example is co-axial with longitudinal axis LC of the carrier vehicle 102, and also co-axial with the longitudinal axis LB of the booster 101 (while the carrier vehicle 102 is mounted to the booster 101). However, in alternative variations of this example, the longitudinal axis LA, can be parallel with respect to, or alternatively at a non-zero angle with respect to, longitudinal axis LC of the carrier vehicle 102 and/or with respect to the longitudinal axis LB of the booster 101 (while the carrier vehicle 102 is mounted to the booster 101).

Figure 5:
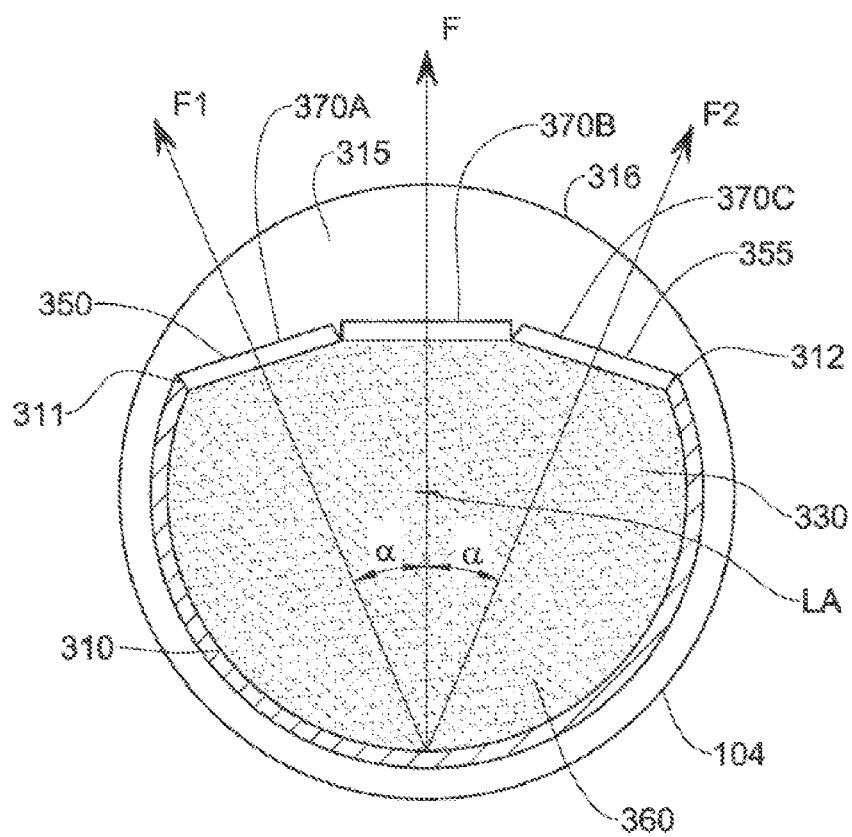
FIG. 5 shows in cross-sectional view the fragmentation warhead of the example of FIG. 4.

Referring in particular to FIG. 4 and FIG. 5, the fragmentation warhead 300 includes a shell 320 extending along said longitudinal axis LA and comprising a fixed shell portion 310 and a fragmentation portion 350. A cavity 330 is defined between the fixed shell portion 310 and a fragmentation portion 350, in which there is accommodated an explosive charge 360.

The fixed shell portion 310 is configured so that upon initiation of detonation of the explosive charge 360, shockwaves propagating therefrom are directed via the fixed shell portion 310 the towards said fragmentation portion 350. Thus, on detonation of the explosive charge, the fixed shell portion 310 retains its mechanical integrity and directs the blast of the explosion towards the fragmentation portion 350, causing the fragmentation portion to fragment into the individual fragments 355, and causing the fragments to be ejected at high velocity in directions F1, F and F2.

Figure 6:
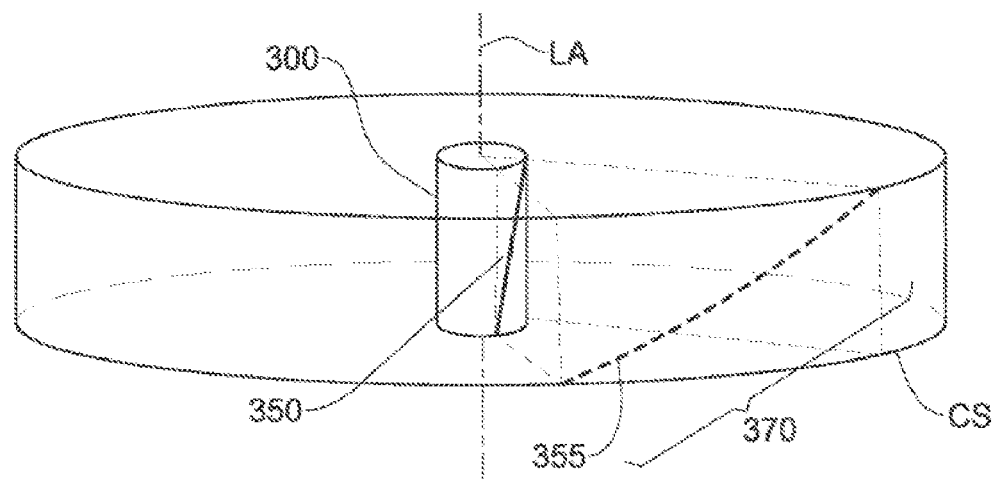
FIG. 6 schematically illustrates the fragmentation pattern of one set of fragments of the fragmentation warhead of the example of FIG. 4.
Figure 6A:
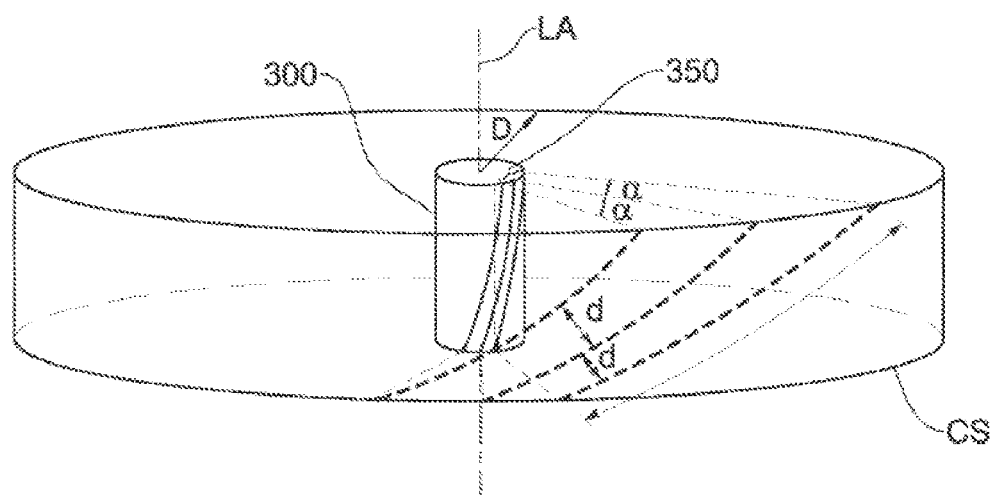
FIG. 6A schematically illustrates the fragmentation patterns three sets of fragments of the fragmentation warhead of the example of FIG. 4.

As will become clearer herein, and referring to FIGS. 6 and 6A, the fragmentation portion 350 is configured for fragmenting into three laterally adjacent sets 370 of individual fragments 355, wherein each set 370 comprises a plurality of serially adjacent but spaced fragments 355 in generally helical relationship with respect to the longitudinal axis LA, in response to detonation of the explosive charge 360—for the sake of clarity FIG. 6 shows only one such set 370, while FIG. 6A shows the three sets 370. In alternative variations of this example, the fragmentation portion 350 is configured for fragmenting into only one set 370 of fragments 355, or for fragmenting into two laterally adjacent sets 370 of fragments 355, or for fragmenting into a plurality (including more than three) laterally adjacent sets 370 of fragments 355, wherein each set 370 comprises a plurality of serially adjacent fragments 355 in generally helical relationship with respect to the longitudinal axis LA, in response to detonation of the explosive charge 360.

The shell 320, and in particular the fixed shell portion 310 has rotational symmetry about the longitudinal axis LA. In this example, the shell 320, and in particular the fixed shell portion 310 is generally tubular, with end walls 321, 322, which in this example are generally flat in the vicinity of the fragmentation portion 350. However, in alternative variations of this example, the shell 320, and in particular the fixed shell portion 310 can have a different rotational symmetry, for example in the form of a bulging cylinder or capped sphere, and/or the end walls can be non-flat, and/or the fixed shell portion can have a polygonal cross-section, for example.

The fragmentation portion 350 is formed as a generally helical band 390 with respect to the longitudinal axis LA, and the fixed shell portion 310 comprises a generally helical slot defined by edges 311, 312 (FIG. 5) complementary to the helical band 390. The helical band 390 in this example comprises three laterally adjacent sets 370 of fragments 355 (separately referred to as sets 370A, 370B, 370C), wherein each set 370 comprises a plurality of serially adjacent fragments 355 in correspondingly serially contiguous relationship in the fragmentation portion 350 and in generally helical relationship with respect to the longitudinal axis LA.

Thus, in each set 370, the fragments 355 are contiguous prior to detonation of the explosive charge 360, and are subsequently spaced apart after detonation and ejection of the fragments 355 from the fragmentation warhead 300.

Figure 7:
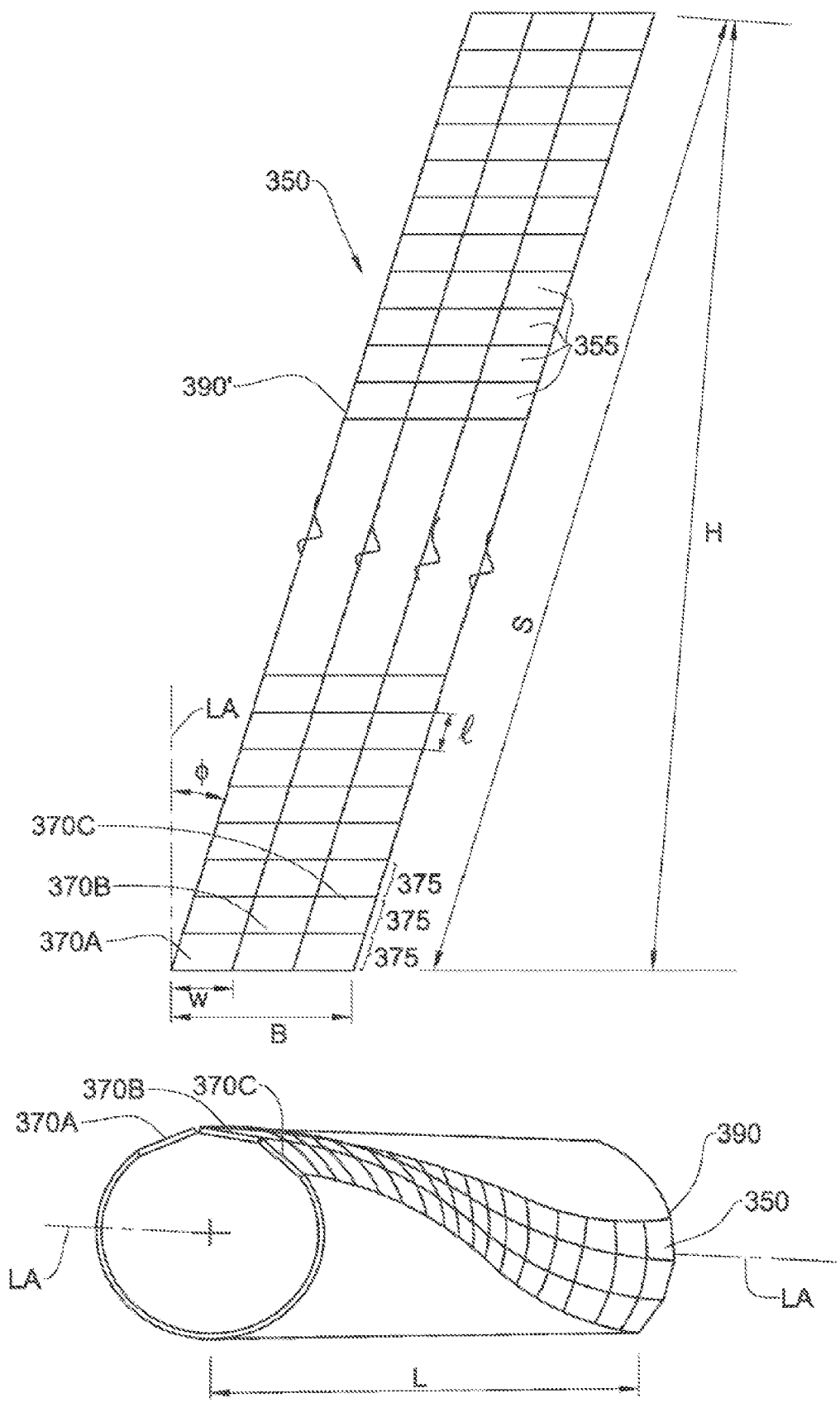
FIG. 7 illustrates the projection onto a plane of the fragmentation portion of the example of FIG. 4.

As illustrated in FIG. 7, the generally helical band 390 is projectable to a plane to provide a flat projection of the band, designated 390' in this figure. The projected band 390' forms a two dimensional pattern of the contiguous fragments 355, the pattern being in the form of a parallelogram having a base B and height H. Correspondingly, in this example, each fragment 355 also has a parallelogram planform.

Each set 370 is thus oriented at a helix angle Φ with respect to the longitudinal axis LA. In this example, the helix angle Φ is such that the respective fragments 355 of each set 370, after detonation of the explosive charge 360 and ejection of the fragments 355 from the fragmentation warhead, are spread over an imaginary cylindrical surface CS (see FIGS. 6, 6A) along a distance on this surface CS of between about 2 m to about 4 m, at a corresponding radial distance of between 4.5 m and 7.5 m, respectively, from said longitudinal axis, while ensuring a spacing of not greater than 0.10 m between adjacent fragments 355 at this radial distance. Thus, each set 370 requires between 20 and 40 fragments.

For example, the helix angle Φ is between 2.5° and 3°.

In this example, the base B corresponds to the width w of three fragments 355, and a height H corresponding to the axial length L of the fragmentation warhead 300. In this example, the width w of each fragment 355 is about 24 mm, and thus the base B is about 72 mm. The thickness of each fragment 355 can be about 5 mm, for example.

The fragmentation portion 350 is formed as a plurality of axially adjacent fragmentation portion sections 375, each fragmentation portion section 375 comprising a number of fragments 355 in lateral adjacent, abutting or contiguous relationship, In this example, each fragmentation portion section 375 has three fragments 355: a first fragment 355 belonging to the first set 370A, a second fragment 355 belonging to the second set 370B, and a third segment 355 belonging to the third set 370C. In this example, there are 38 fragmentation portion sections 375 along the axis LA, corresponding to the 38 fragments of each set 370. Each fragment has a length l of about 17 mm, and thus the length S of the long size of the projected band 390' is about 646 mm. In alternative variations of this example, each set can have more than or less than 38 fragments 355.

In alternative variations of this example, the fragmentation portion can comprise three sets 370 of 40 fragments each, and/or the fragments 355 can be rhombic-shaped with width w 17.6 mm and length 17.6 mm and thickness 6.6 mm; thus the corresponding base B is 53 mm.

The plurality of fragments 355 of each successive fragmentation portion section 375 along the longitudinal axis LA is angularly displaced about the longitudinal axis LA with respect to the respective plurality of fragments 355 of the previous fragmentation portion section 375, thereby providing the generally helical relationship of the fragments 355 in each set 370 with respect to the longitudinal axis LA.

In this example, and referring to FIG. 4, the plurality of fragments 355 of a first fragmentation portion section 375 at one longitudinal end of the fragmentation portion 350 (corresponding to end wall 321) is angularly displaced about the longitudinal axis LA with respect to the plurality of fragments 355 of a last fragmentation portion section 375 at another longitudinal end of the fragmentation portion 350 corresponding to end wall 322) by an angular displacement corresponding to an aggregate dispersion angle θ. In this example, angle θ is between 25° and 35°, preferably about 30°, though in alternative variation of this example, angle θ can instead be different, for example between 18° and 22°. The aggregate dispersion angle θ determines the density of fragments 355 at predetermined distances from the axis LA. For example, the larger the aggregate dispersion angle θ, the larger the spread of the fragments 355 at a given radial distance, but the greater the spacing between adjacent fragments 355, for the same number of fragments. The choice of aggregate dispersion angle θ depends on the accuracy of determination of relative distance and position between the flying object and the carrier vehicle, and the size of killing zone of the flying object.

Thus, in this example, the respective plurality of fragments 355 of each pair of successive fragmentation portion sections 375 are angularly displaced from one another with reference to (i.e., along) a plane orthogonal to the longitudinal axis LA by a fragmentation set dispersion angle θ'. Such fragmentation set dispersion angle θ' is between about 0.5° and about 1°. For example, fragmentation set dispersion angle θ' is between about 0.75° and about 0.8° for an aggregate dispersion angle θ of 30°, for achieving a maximum spacing of 0.1 m between two adjacent fragments 355 at a radial distance of about 7.5 m, and between about 0.45° and about 0.55° for an aggregate dispersion angle θ of 20° for achieving a maximum spacing of 0.1 m between two adjacent fragments 355 at a radial distance of about 10 m, assuming 40 fragments per set 370.

Figure 5A:
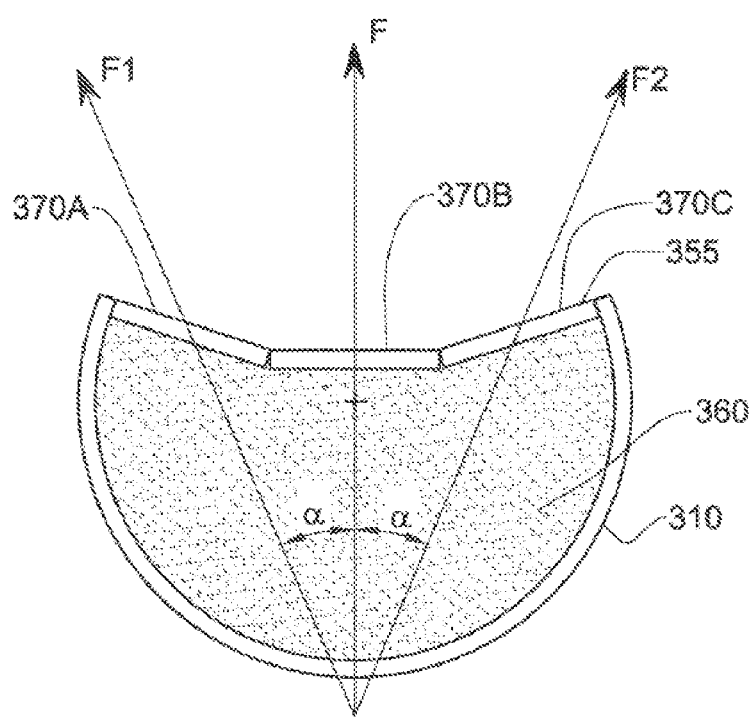
FIG. 5A shows in cross-sectional view a variation of the fragmentation warhead example of FIG. 5.

In this example, and referring again to FIG. 5, the respective fragments 355 of each fragmentation portion section 375 can be coplanar, or in general convex relationship with respect to cavity 330 (i.e., projecting convexly away from cavity 330), or in general concave relationship with respect to cavity 330 (i.e., projecting convexly toward cavity 330), depending on the magnitude of the angular dispersion desired between the fragment sets 370. Thus, while the central fragment 355 is facing direction F, each of the two outer fragments 355 are facing in directions F1 and F2, respectively, angularly displaced from direction F by angle α. For relatively small angular dispersion a, of less than 5° for example, the respective fragments 355 of each fragmentation portion section 375 are in general concave relationship with respect to cavity 330 (i.e., projecting convexly toward cavity 330), as illustrated in FIG. 5A. without being bound to theory, it is considered that the actual direction of ejection (angle α) of the fragments 355 of the outer sets 370A, 370C is determined by an interaction of direct shockwaves with the fragments 355 originating from the explosive material 360, the shockwaves reflected by the fixed shell portion 310 to the fragments 355, and boundary effects between the outer fragments 355 and the shell at edges 311, 312, and boundary effects between adjacent fragments 355. Thus, for example, in variations of this example where the adjacent fragments 355 of the three sets 370 are coplanar, the fragments can be ejected with a dispersion angle α greater than about 5°.

The curvature formed by the respective fragments 355 of each fragmentation portion section 375 is less than the curvature of the fixed shell portion 310, and provides a space 315 between the fragmentation portion 350 and the outer casing 316 of the warhead module 104.

In this example, each fragment 355 has a weight of between 25 g and 35 g, for example about 30 g. However, in alternative variations of this example, each fragment can instead have a weight of between 2 g and 50 g, depending on the nature of the target, and the specific configuration of the respective carrier vehicle and fragmentation warhead.

In this example, the fragmentation warhead 300, in particular the fragmentation portion 355 contains a total number of said fragments having an aggregate weight of between 3 Kg and 4.5 Kg, for example 3.42 Kg. However, in alternative variations of this example, the fragments 355 can have an aggregate weight of between 2.4 Kg and 5 Kg, for example.

In general, the weight of the explosive material 360 at least matches that of all the fragments 355, say another 4 Kg, and the weight of the shell fixed portion 310 also generally matches that of the fragments. Thus, for an aggregate weight of about 4 Kg, the fragmentation warhead is about 12 Kg. In addition, the remainder of the carrier vehicle 102 (structure, avionics etc) can weigh another 12 Kg.

Thus, the net weight of the fragmentation portion 350 allows the carrier vehicle 102 to weigh 24 Kg or less, and allows this to be carried by a booster stage 101 that is based on a Grad type rocket, in which the conventional Grad warhead has a comparable weight of about 19 Kg.

In this example, the fragmentation warhead 300, in particular the fragmentation portion 350 contains a total number of fragments 355 of between 100 fragments and 200 fragments, for example 114 fragments. However, in alternative variations of this example, the fragmentation warhead 300, in particular the fragmentation portion 350 can contain a total number of fragments 355 of between 1,200 light fragments (of 2 gr each) and 100 fragments (of 50 gr each) while maintaining the same aggregate weight between 2.5 Kg and 5 Kg for the fragmentation portion 350.

In this example, each fragment 355 is configured to be capable to neutralize the warhead of an incoming grad-type rocket, under the following conditions:

(A) the respective fragment 355 is ejected from the fragmentation warhead 300 via detonation of the explosive charge 360 to provide an impact velocity with respect to the warhead of an incoming grad-type rocket sufficient to impact and penetrate the warhead of an incoming grad-type rocket;

(B) the respective fragment 355 impacts the warhead of an incoming grad-type rocket within a predefined kill zone defined with respect to the warhead of an incoming grad-type rocket, such that penetration of the fragment 355 in this kill zone neutralizes the warhead.

In other words, each fragment 355 is capable of neutralizing the incoming warhead by impacting the kill zone.

Regarding condition (A), this can be achieved by providing the respective fragment 355 with the required momentum. For example this can be achieved by detonating the explosive charge 360 when the warhead of an incoming grad-type rocket is within a predetermined range, and by providing a suitable material for the explosive charge, which are well known in the art. For example, such a suitable impact velocity can be provided by intercepting the warhead of an incoming grad-type rocket within a 10 m range, for example within a range of 4.5 m to 7.5 m, from the fragmentation warhead 300, and by ejecting the fragments 355 at a velocity of about 1.7 km/s. The impact velocity is determined from the ejection velocity and the closing velocity between the carrier vehicle and the flying object. For example, such an impact velocity can be about 2 km/s.

Figure 8:
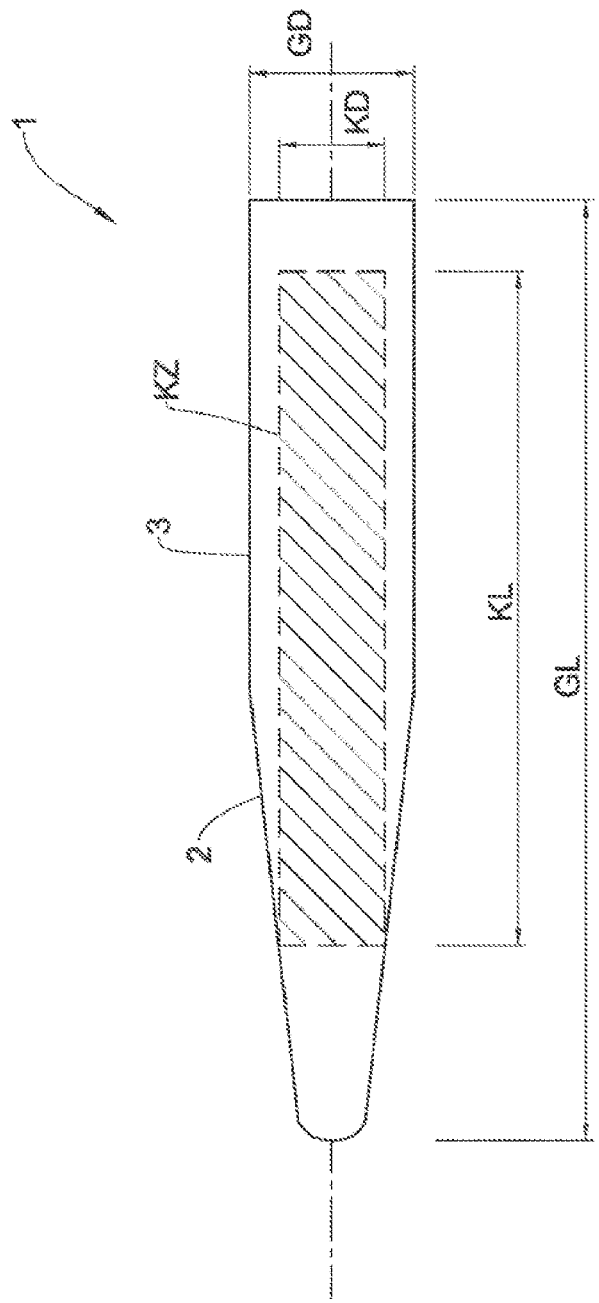
FIG. 8 illustrates an example or a target incoming rocket warhead.

Regarding condition (B), and referring to FIG. 8, the warhead of an incoming grad-type rocket is designated with reference numeral 1, and typically has a generally ogive or conical nose 2 and cylindrical aft section 3, having an overall length dimension GL of about 700 mm, and diameter GD of about 122 mm. The kill zone, designated KZ in this figure, is defined within the volume of the incoming threat, for example in the form of warhead 1, for example as cylindrical surface or volume of diameter KD and length KL (being smaller than the diameter GD and length dimension GL, respectively), coaxial with the incoming warhead 1. Thus, the kill zone KZ appears as a rectangular zone when the incoming warhead 1 is seen in side view, as in FIG. 8. For a typical Grad type rocket, the kill zone length KL can be about 500 mm, and the kill zone diameter KD can be 100 mm. This value for kill zone diameter KD corresponds to providing a strike angle with respect to the surface of the incoming warhead 1 of 30° or more.

According to an aspect of the presently disclosed subject matter the fragmentation warhead 300 is configured for being maneuvered to a predicted interception point (PIP) via the carrier vehicle 102 for intercepting within a probability envelope PE a flying object having a kill zone of known dimensions. For example the flying object is warhead 1 with kill zone KZ of size 500 mm by 100 mm. In other words, and as will become clearer herein, the probability envelope PE can be considered to be a volume in space associated with the PIP where it is determined, with a high degree of certainty, that the kill zone KZ is to be found. As will become clearer herein, the fragmentation warhead 300 is configured for selectively providing a plurality of fragments 355 directed towards this probability envelope PE such that the spacing between any two adjacent fragments 355 within the probability envelope PE is less than at least one of dimensions of the kill zone KZ, to ensure that at least one fragment 355 impacts the kill zone KZ within the probability envelope PE, thereby neutralizing the incoming warhead.

Figure 9:
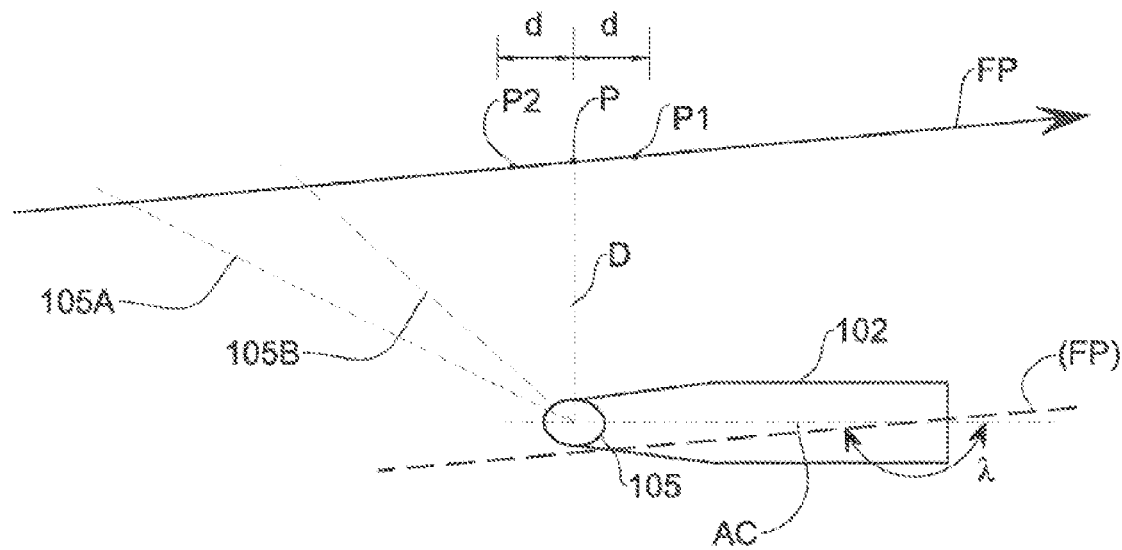
FIG. 9 schematically illustrates operation of the proximity fuse of the example of FIG. 1.

Referring to FIG. 9, it is anticipated that, at least in some examples, the carrier vehicle 102 approaches the PIP with longitudinal axis AC non-parallel to the longitudinal axis of the warhead 1, which is typically aligned with flight path FP of the incoming warhead 1, for example more or less aligned with the flight path FP. Alternatively, for example, the longitudinal axis AC is angled to the longitudinal axis of the warhead 1 (which is typically aligned with flight path FP) at a relative angle λ up to −20° to +40° to the flight path FP for pursuit scenario, or between +160° to 220° for head-on scenario. Further, the proximity fuse 105 detects the presence of the warhead 1 in proximity to the carrier vehicle 102, and in response thereto the explosive charge 360 is detonated.

Figure 11:
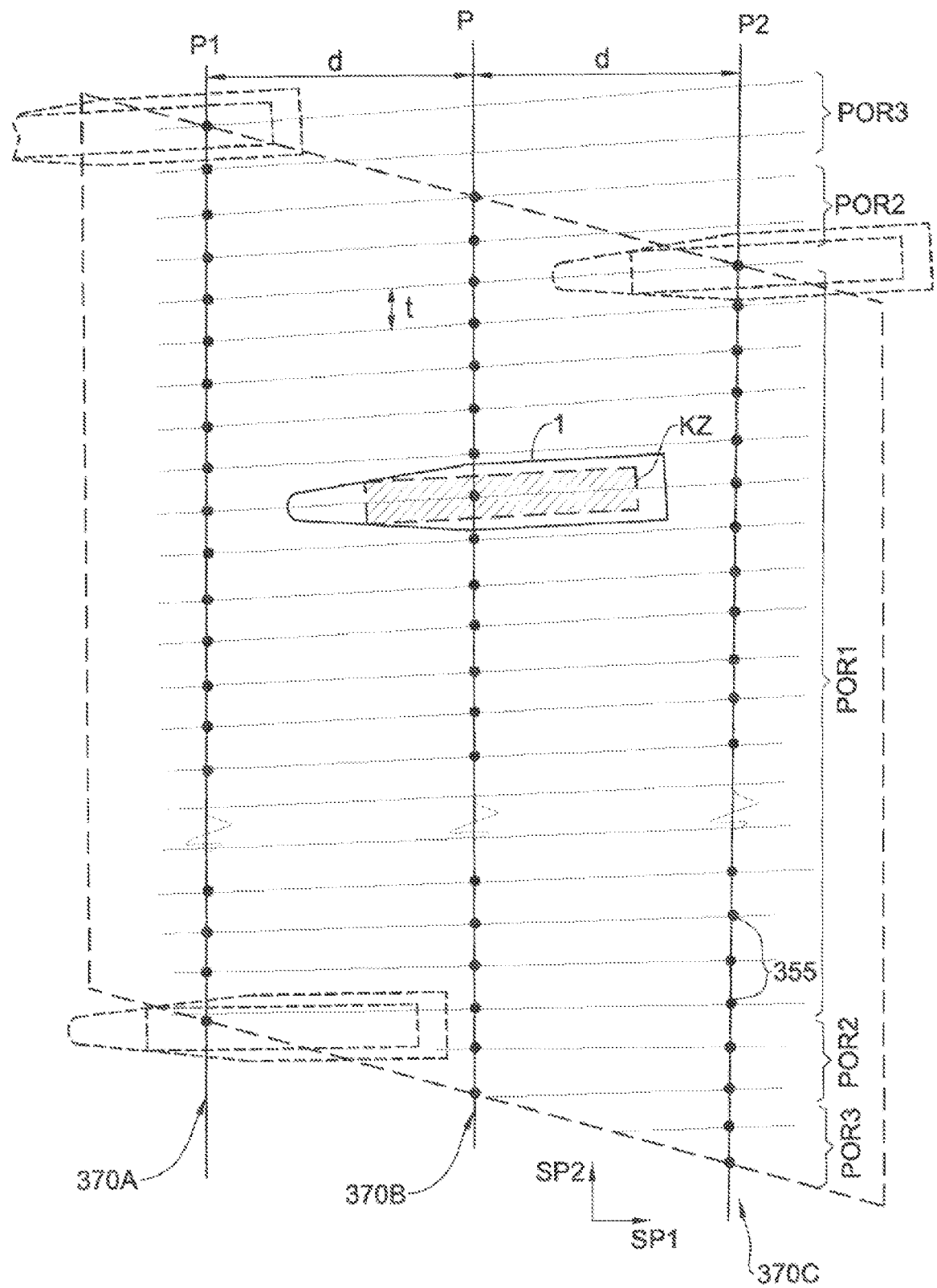
FIG. 11 schematically illustrates a probability envelope according to an ex ample thereof.

Referring to FIG. 6, it is readily appreciated that the helix angle of the fragments 355 of each set 370 when the fragments 355 are still on the fragmentation warhead 350 (i.e., prior to detonation) increases rapidly with radius from the axis LA as the fragments 355 are ejected after detonation. Thus, starting with a small helix angle of about 2° or 3° prior to detonation, the helix angle can increase to about 80° at a distance of between 4.5 m and 7.5 m from the axis LA. Thus, the relative angle λ between the axis LA and the flight path FP of about 10° (or)190° ensures that the disposition of the ejected fragments 355 of each set 370 with respect to the flight path FP ate the PIP will be approximately orthogonal. Referring to FIG. 11, this is the optimal angular relationship between the fragments and the longitudinal axis of the flying object (assumed to be parallel to the flight path FP thereof).

Referring to FIG. 11, it is to be noted that increasing the helix angle results in a decrease in the spacing d between adjacent sets 370 of ejected fragments 355, in a direction SP1 orthogonal to the direction of spread SP2 of the fragments along each set 370. This effect can be compensated by increasing the initial dispersion angle α between adjacent sets of fragments 370A, 370B, 370C.

Another effect of increasing the helix angle is related to the partial overlap between the adjacent sets along the direction of the spread SP2 of the fragments along each set 370. As can be seen from FIG. 11, the spread of the ejected fragments 355 when projected onto a plane is in the form of a parallelogram, and thus:

a central portion POR1 of the ejected fragments 355 contains fragments from all three sets 370A, 370B, 370C in overlapping relationship;

a mid-portion POR2 on each side of central portion POR1 of the ejected fragments 355 contains fragments from two sets (370A, 370B) or (370B, 370C) in overlapping relationship;

an outer portion POR3 on the outer side of each mid-portion POR2 contains fragments from one set (370A or 370C)

It is possible to change the degree of overlapping between the adjacent sets 370A, 370B, 370C of ejected fragments 355 by modifying the geometry of the fragmentation warhead 300, for example by modifying the general cylindrical geometry of warhead 300 to the form of a barrel, in which the diameter at the center (axially) is larger than at the longitudinal ends thereof.

There is a tradeoff between:
choosing the initial dispersion angle α;
limiting the angular deviation between the flight path of the carrier vehicle and the flight path of the threat, with respect to the optimal angular deviation that ensures orthogonality between the target body (along the longitudinal axis thereof) and the direction of spread SP2 of the ejected fragments 355 of each et 370;
the requirement for accuracy of the proximity fuse.

In at least one example, final parameters of the fragmentation warhead to provide a desired spread of fragments to provide a desired spacing d, a desired overlap, and a desired tradeoff, can be finalized following system performance simulations, for example.

However, it is possible to deviate from orthogonality by up to ±30° and still provide a lethal spread of fragments in each set 370. Non-orthogonality increases the effective spacing between the ejected adjacent sets 370, as seen by the flying object. For example, a deviation of up to ±30° effectively increases spacing between ejected adjacent fragments 355 of the same set 370 by up to 15%.

Thus, in a pursuit scenario, in which the carrier vehicle 102 is travelling in a similar direction to the flying object, the relative angle λ can be between −20° (i.e., −30° plus 10°) to +40° (i.e., +30° plus 10°) to the flight path FP. On the other hand, for head-on scenario in which the carrier vehicle and the flying object are travelling in opposite directions towards one another, the relative angle λ can be between +160° (i.e., −30° plus 10° plus 180°) to 220° (i.e., +30° plus 10° plus 180°).

In this example, the proximity fuse 105 radiates two flat laser beams 105A and 105B, angularly displaced from one another with respect to the axis AC. As illustrated in FIG. 9, a flying object such as warhead 1, for example, in the head-on interception scenario, or the wrap around fins, for example, in the pursuit interception scenario, will first cross the first beam 105A, and then the second beam 105B, and the proximity fuse registers at least the times when:

the threat (e.g., the warhead 1 in the head-on interception scenario, or the wrap around fins in the pursuit interception scenario) interrupts the first beam 105A;

the threat (e.g., the warhead 1 in the head-on interception scenario, or the wrap around fins in the pursuit interception scenario) interrupts the second beam 105B.

In some cases, the proximity fuse 105 also registers the time when the threat finishes interrupting the first beam 105A, and has thus fully cleared this beam, and/or the time when the threat finishes interrupting the second beam 105B, and has thus fully cleared this beam, and these additional measurements can improve the accuracy of the determination of fusion time by the proximity fuse.

These times allow the proximity fuse 105 to determine when the warhead 1 will be at the required distance D to the carrier vehicle 102, and thus to the fragmentation warhead 300, for example using a suitable algorithm (for example based on proportional navigation of central fragments). At the distance, the warhead 300 will be activated. Such an algorithm includes other inputs, for example regarding the closing velocities between the carrier vehicle 102 and the incoming threat, as provided by an external source for example, via uplinks from communication system 204. Such an algorithm can also include other inputs, for example average ejection velocity of the fragments 355, and/or the time delay between sending of the commands for detonation of the explosive charge 360 and the actual ejection of the fragments 355, and/or estimated time delay due to atmospheric drag of the fragments 355, to achieve a required radial distance D. The proximity fuse then operates to provide a suitable detonation signal to detonate the explosive charge 360 at closing distance D, essentially at a calculated time interval after the threat crosses the two laser beams.

The guidance system also maneuvers the carrier vehicle 102, for example by providing suitable roll moments, so that the fragmentation portion 350 is facing towards the flight path FP, and this is carried out prior to operation of the proximity fuse 105.

Figure 9A:
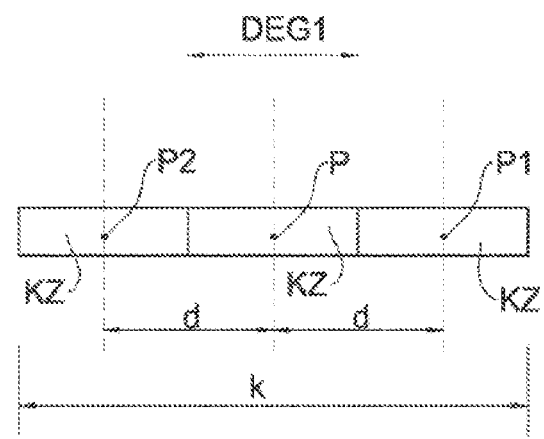
FIG. 9A schematically illustrates degree of uncertainty associated with operation of the proximity fuse.

Nevertheless, there can be a degree of uncertainty as to the location of the warhead 1 in first direction along the flight path FP, and this is referred to herein as the first degree of uncertainty DEG1 as illustrated in FIG. 9A. A source for this first degree of uncertainty DEG1 is that it is unknown whether the laser beams are impinging the front end or the aft end of the threat, and thus it is prudent to provide fragments 355 not just at the point P on the flight path FP corresponding to the closing distance D, but also at a point P1 ahead of P, and also at a point P2 aft of P. Forward point P1 is provided to take account of the possibility that the aft part of the warhead 1 is at point P and thus most of the warhead 1 (including the kill zone KZ) is forward thereof. Aft point P2 is provided to take account of the possibility that the nose of the warhead 1 is at point P and thus most of the warhead 1 (including the kill zone KZ) is aft thereof. Spacings d, between point P2 and P, and between P and P1, are each set to be not greater than the axial length of the kill zone along the flight path FP direction, i.e., not greater than lengthy KL, in this example not greater than 0.5 m. This axial spread of 3 fragments 355 along the flight path FP essentially ensures hitting the kill zone KZ with respect to the axial direction (flight path FP) of the warhead 1, wherein the kill zone KZ can be in an axial range k of $(2*d+2*KL)$, which is $\pm(d+KL)$ of point P (axially), in this example $\pm 0.75$ m to $\pm 1$ m of point P (axially). This axial range k thus defines a first dimension of the probability envelope PE along the direction of the flight path FP.

Figure 10:
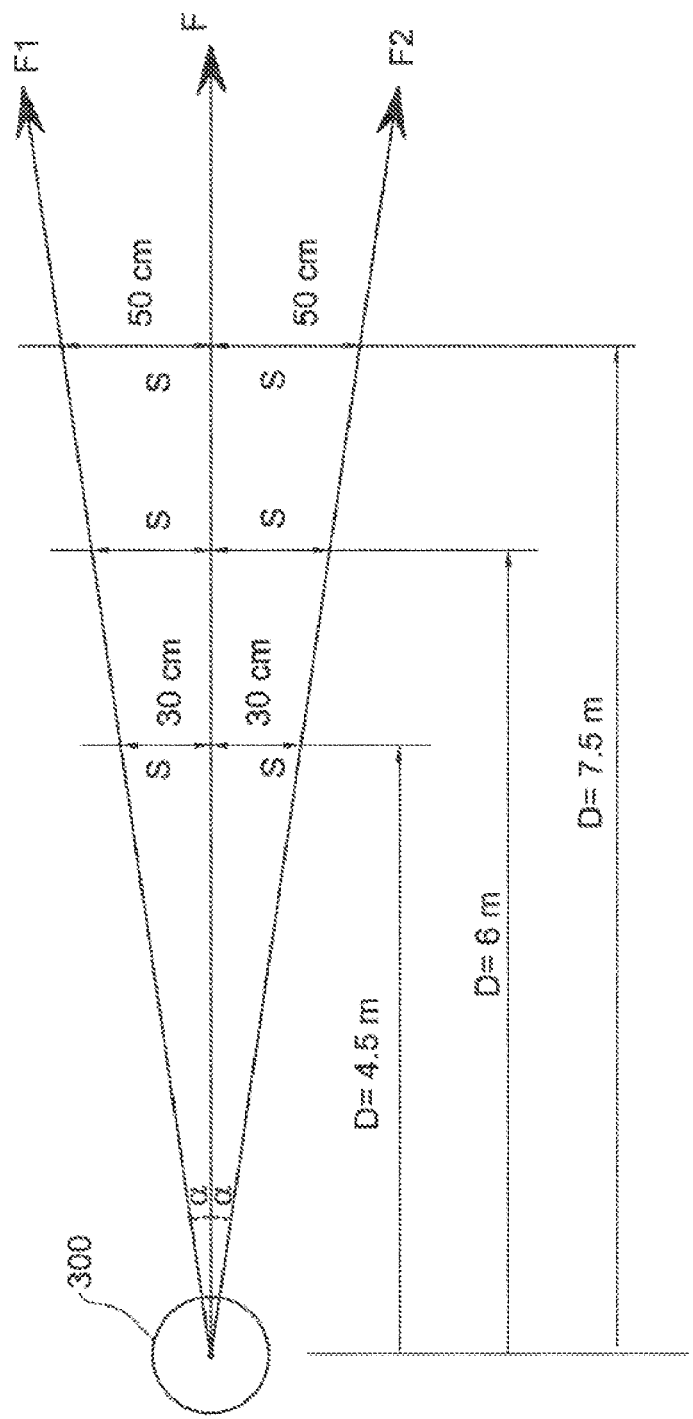
FIG. 10 schematically illustrates divergence of fragments of the example of FIG. 5.

In this example, it is further anticipated that the carrier vehicle 102 will be maneuvered to the PIP, such that the closing distance D is between 4.5 m and about 7.5 m. Referring again to FIG. 5, the central fragment 355 is facing direction F, and each of the two outer fragments 355 are facing in directions F1 and F2, respectively, angularly displaced from direction F by angle $\alpha$. Referring also to FIG. 10, angle $\alpha$ can be chosen such that the lateral spread s of each outer fragment 355 with respect to the central fragment 355 does not exceed spacing d, i.e. is not greater than the length KL, which in this example is 0.5 m. Thus, with the maximum spread s set at 0.5 m at a maximum closing distance D, angle $\alpha$ is arctan ((0.5/sin (helix angle))/7.5), which is minimum about 3.8°, the helix angle being that of the ejected set 370 of fragments 355 at this radius. At the same time, this value for angle $\alpha$ provides a lateral spread s of about 0.3 m at the minimum closing distance D of 4.5 m.

There can be another degree of uncertainty as to the location of the warhead 1 in a second direction orthogonal to the flight path FP, and this is referred to herein as the second degree of uncertainty DEG2. A source for this second degree of uncertainty DEG2 is that the lasers of the proximity fuse 105 can have an angular spread about the axis AC (see FIG. 2) of the carrier vehicle 102, and it is unknown whether a forward part or an aft part of each laser beam is impinging the threat, and thus it is prudent to provide a plurality of fragments 355 at each of the points P1, P and P2, wherein each plurality of fragments is spread in the second direction (generally orthogonal to the axial or flight path FP direction) to cover for this uncertainty. At the same time, the spacing t between fragments 355 in each plurality of fragments 355 must be such that at least one such fragment will hit a kill zone KZ found therein. Thus, this spacing t is not greater than the lateral dimension of the kill zone, i.e., not greater than kill zone diameter KD at the maximum closing distance D. In this example, the kill zone diameter KD is 100 mm, and this defines the maximum spacing t at maximum closing distance D of 7.5 m. Thus, if each set 370 has a plurality of m fragments 355, the full lateral spread f of the fragments 355 at each of the points P1, P and P2, is thus m*t.

This lateral spread f thus defines a second dimension of the probability envelope PE generally orthogonal to the direction of the flight path FP.

As illustrated in FIGS. 6 and 6A, the general helical configuration of each set 370 of fragments 355 in the fragmentation portion 350 allows a relatively large lateral spread f to be obtained from a fragmentation warhead of much smaller axial length L along axis LA. For a given axial length L of the fragmentation warhead 300 and for a given fragment size, the larger the aggregate dispersion angle $\theta$, the greater the lateral spread f and the greater the spacing t between fragments 355.

At the same time, and referring also to FIGS. 4 and 5, the general helical configuration of each set 370 with the respective fragments 355 in the outer sets 370A, 370C facing directions at an angle $\alpha$ to the respective fragments of the central set 370B provides a controlled spacing between the adjacent sets 370 of fragments 355 corresponding to spacings d. The greater the angle $\alpha$, the larger the spacing s between adjacent sets 370 of fragments for a given closing distance D.

The range of closing distance D between the minimum closing distance D and the maximum closing distance D defines the third dimension of the probability envelope PE.

Thus, referring to FIG. 11, the probability envelope PE at a particular closing distance D ensures that at least one fragment 355 will impact a kill zone KZ that overlaps anywhere with respect to the probability envelope PE. At the same time, the general helical configuration of each set 370 allows the fragments 355 to be specifically directed towards the probability envelope and to cover therein a large lateral spread and a large axial spread of fragments, the fragments originating from the compact volume provided by the fragmentation warhead 350, that in this example is configured for being launched via a Grad type booster stage.

It is also evident that that the fragmentation warhead 300, while being configured for being mounted in the carrier vehicle 102, and having a longitudinal dimension L along a longitudinal axis LA, is also configured for selectively providing a plurality of fragments 355 directed towards a target area spaced at an interception spacing from fragmentation warhead 300 corresponding to the closing distance D, to provide a fragmentation pattern on the target area. Referring to FIG. 11, for example, the fragmentation pattern includes at least one set, and in this example three sets, of fragments 355 in a spaced linear relationship, wherein the fragments are spaced at spacing t in each set. The spaced fragments 355 in each set at the target area extend to a length dimension (corresponding to the lateral spread f) greater than this longitudinal dimension L, wherein adjacent fragments in each set at the target area are spaced at a respective fragmentation spacing (spacing t) that is within the dimensions KL or KD of the kill zone KZ of the intended target, i.e., the warhead 1. It is further evident that each fragment 355 is capable of neutralizing the intended target by impacting the kill zone KZ thereof.

Thus, and referring also to FIG. 6 and FIG. 6A, the fragmentation portion 350 is configured for fragmenting into a plurality of laterally adjacent sets 370 of serially adjacent fragments 355 in generally helical relationship with respect to the longitudinal axis LA, in response to detonation of the explosive charge 360. In this example, the fragmentation portion 350 is configured for fragmenting into three laterally adjacent sets 370 of fragments 355, each set comprising between 30 and 50 serially adjacent fragments 355 in generally helical relationship with respect to the longitudinal axis LA, in response to detonation of the explosive charge 360.

It is evident that after detonation of the explosive charge 360, the fragments 355 of each set 370 are serially spaced at a spacing t that is less than a diameter GD of warhead 1 at a distance less than 7.5 m from the longitudinal axis LA.

It is also evident that after detonation of the explosive charge 360, each set of fragments 355 is spaced from an adjacent set of fragments 355 at a spacing d that is less than the axial length GL of the warhead 1 at a distance less than 7.5 m from longitudinal axis LA.

According to an aspect of the presently disclosed subject matter the fragmentation warhead 300 is configured for being maneuvered to a predicted interception point (PIP) via the carrier vehicle 102 for intercepting within a probability envelope a flying object having a kill zone of known dimensions.

Figure 12A:
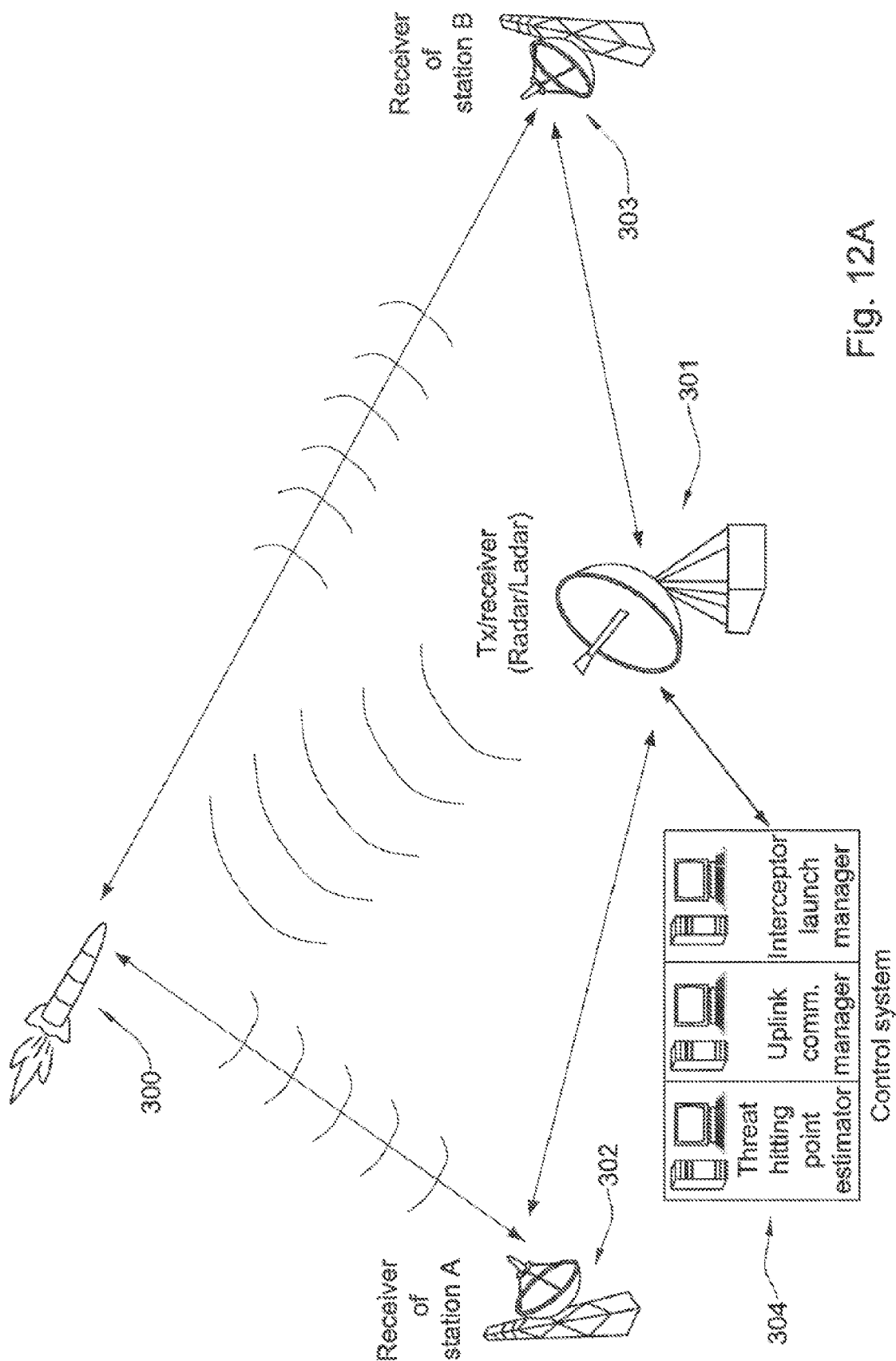
FIG. 12A illustrates a generalized detection and tracking scenario that is devoid of utilization of a seeker head, in accordance with certain examples of the presently disclosed subject matter.

Turning now to FIG. 12A, this illustrates a generalized detection and tracking scenario that is devoid of seeker head, in accordance with certain examples of the presently disclosed subject matter. Thus, a flying target rocket 300, i.e., corresponding to the incoming warhead 1 of FIG. 8, is detected and tracked by an active sensor 301 (e.g. radar or ladar). Note incidentally that for convenience the term radar is mainly used herein but should be regarded by those skilled in the art as only an example of active sensor.

The latter emanates radiation which is reflected by the flying target and received by the active sensor 301 and additional two passive receiving sensors 302 and 303 whose locations are known in advance at decimeter level of accuracy. The specified three sensors (constituting a sensor array) are configured to utilize respective clocks at a relative synchronization accuracy of at least 1 nanosecond between each two of them and are capable of determining an updated flying rocket's location at a high accuracy of say less than a meter and therefrom the control system 304 is configured to determine an updated Predicted Interception Point (PIP) in which the interceptor will hit the target. The preliminary predicted interception point (PIP), a time of launch and interceptor missile separation time are transferred as a part of mission data to the interceptor (not shown) before launching. Updates of PIP are transferred to the interception during the flight via the uplink communication channel (not shown). The latter requires an estimation of the locations of both flying objects (rocket and interceptor) during their flights.

Note that in accordance with certain examples the preliminary mission data such as predicted PIP missile separation time (loaded to the interceptor before launch) may be determined based on active sensor only and later on during the flight trajectory of the target, say after the ascending section of the flight trajectory of the target, the passive sensors can also be utilized allowing determination of more accurate data such as updated PIP and updated separation time. The utilization of the passive sensors may for example depend on the specific threat definition and coverage of the passive antennae array.

Note that the determination of updated flying target and interceptor locations and updated PIP may be performed continuously at a desired rate, depending on the particular application.

t aspect of the presently disclosed subject matter, there is provided a fragmentation warhe in accordance with certain examples of the presently disclosed subject matter; As shown, active sensor 3001 and two passive sensors 3002 and 3003 are configured to determine the location of the flying target at high accuracy and send the data to the control system 304. The latter includes the Threat hitting point estimator system 3004 capable of calculating:
the PIP,
the required launch timing of the interceptor missile and
the required timing of interceptor missile separation during its flight.

The Threat hitting point estimator system 3004 transfers the noted above calculated parameters to the Interceptor launch manager system 3005 capable to generate a mission data that includes at least noted above parameters. The Interceptor launch manager transfers the said to launching battery 3006, and finally loaded to the interceptor missile, corresponding to the interception missile 100 of FIG. 1. Note that for determining the launch timing, the Threat hitting point estimator is also fed with the sensor's data indicating the precise location of the detected target rocket. Once the interceptor missile is launched, the threat hitting point system 3004 is fed also with accurate location data of the intercepting missile as determined by the ground sensors array. Based on the accurate location data of both the flying target and the interceptor missile, system 3004 is configured to calculate updated PIP and updated timing of interceptor missile separation and transmit it to the interceptor missile through uplink communication manager system 3007 and the specified data is transmitted through antenna 3008 to the interceptor missile (and received by uplink receiver module—see, e.g. 2007 in FIG. 2C), for further processing by the airborne computer on-board the missile. In addition, the launch time and the planned motor separation time are also transmitted to the missile.

Figure 13:
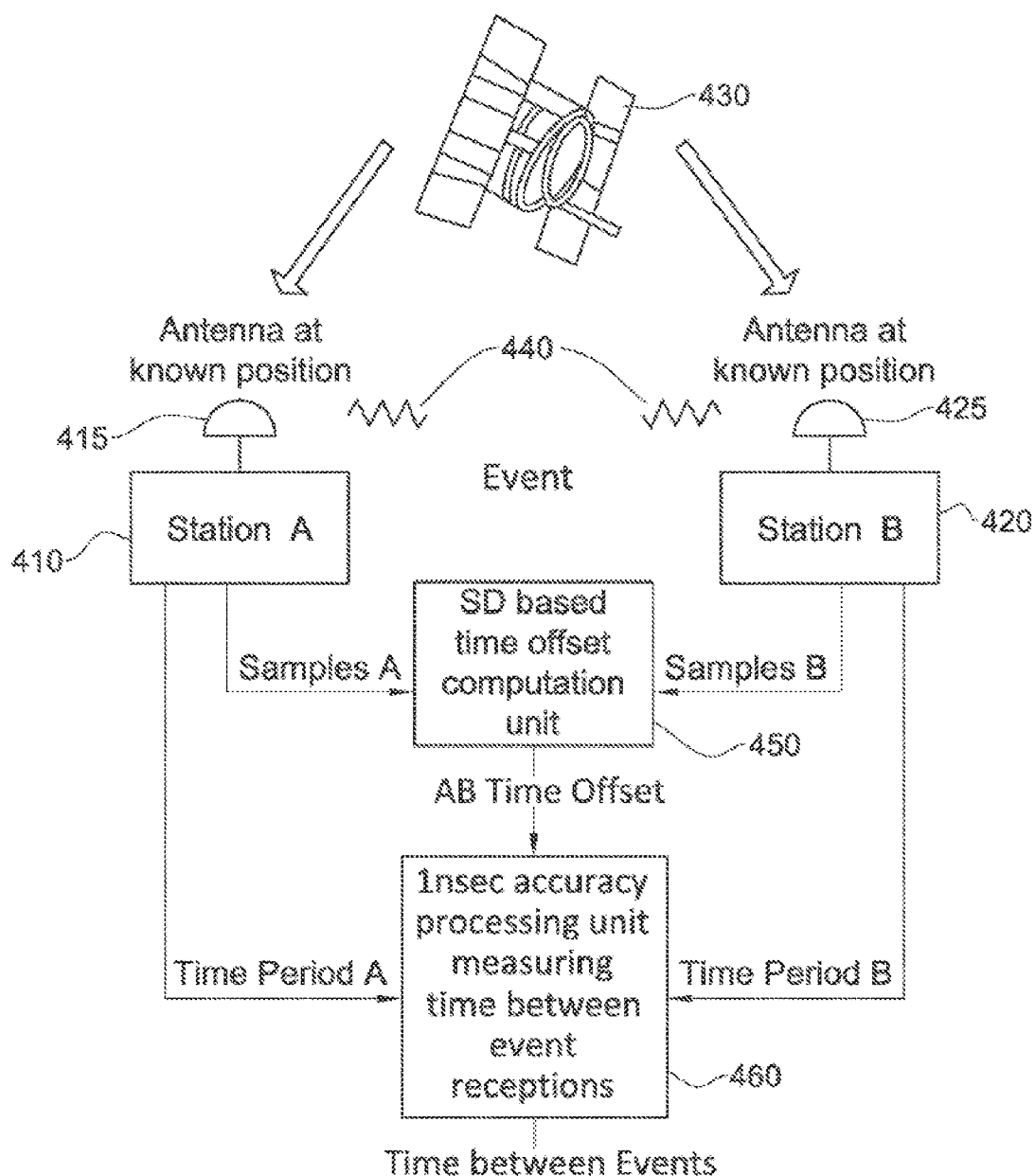
FIG. 13 illustrates schematically a block diagram for implementing accurate synchronization between clocks among sensors, in accordance with certain examples of the presently disclosed subject matter.

Reference is now made to FIG. 13 which is a simplified semi-pictorial semi-functional block diagram illustration of a system for Relative Time Measurement between two or more non-collocated stations 410 and 420 (e.g. any of the two specified sensors 301 to 303 of FIG. 12A) with decimeter level accuracy known coordinates, constructed and operative in accordance with certain examples of the present presently disclosed subject matter. Each station observes a Common External Signal (e.g. produced by GNSS satellite 430) via antennae 415 and 425 respectively. Each station produces time tag samples (pseudo range and integrated Doppler) based on a common external signal which may be generated by or generated responsive to a satellite 430. Each station senses a Common External Event 440 (for example reflection of beam originated by the active sensor power from the target) and computes a precise Time Period between a sensed external event time tag and the time tag of a latest of the samples.

A time offset Computation Unit 450 receives samples from stations A and B and computes a Time Offset between station 410's and 420's clocks at sampling time e.g. using Equations 1-4 below. The time offset information is provided to a nanosecond accuracy processing unit 460 which accurately measures time elapsing between events at stations A and B as described in detail below.

The time offset computation performed by unit 460 is (may be based on a conventional Single Difference (SD) algorithm e.g. as described in Bradford W. Parkinson and James J. Spilker, Global Positioning System: Theory and applications, Vol. II, Chapter 18, Eq. 9. An instant Time Offset is computed between the stations 410 and 420's internal time scales using coherent pseudo ranges and integrated Doppler Samples and the Known Positions of the stations' antennae 415 and 425.

Typically, the Single Difference (SD) algorithm implements the following linear combinations of coherent pseudo-range and carrier phase (integrated Doppler), as follows (Equations a and b):

$$P_{AB}^S = P_B^S - P_A^S = \rho_{AB}^S + \delta t_{AB} \cdot c + B_{AB} + I_{AB}^S + T_{AB}^S + \varepsilon^{code} \quad (a)$$

$$\Phi_{AB}^S = \Phi_B^S - \Phi_A^S \rho_{AB}^S + \delta t_{AB} \cdot c + B_{AB} - I_{AB}^S + T_{AB}^S + F_{AB}^S + \varepsilon^{Phase} \quad (b)$$

where samples A provided by station A of FIG. 13 include:

$P_A^S$—Pseudo-range measurement of satellite S (430 in FIG. 13) at station A, and $\Phi_A^S$—Carrier-phase measurement of satellite S (430 in FIG. 13) at station A. Samples B provided by station B of FIG. 13 include:

$P_B^S$—Pseudo-range measurement of satellite S (430 in FIG. 13) at station B, and $\Phi_B^S$—Carrier-phase measurement of satellite S (430 in FIG. 13) at station B. and wherein:

$\rho_{AB}^S$-Difference in Ranges between stations A and B and satellite S (430 in FIG. 13), C—Speed of light, $B_{AB}$—Difference between hardware delays between stations A and B, e.g. as computed by the calibration apparatus of FIG. 13 in PCT application no. IL2010/000346 (WO 2010/125569), entitled "Relative Time Measurement System with nanosecond Level Accuracy" (hereinafter "The Time Sync Application" whose contents are incorporated herein by reference, and as described in detail below $I_{AB}^S$—Difference in ionospheric delays between stations A and B and satellite S (430 in FIG. 13), $T_{AB}^S$—Difference in tropospheric delays between stations A and B and satellite S (430 in FIG. 13), $F_{AB}^S$—Difference in floating ambiguities between stations A and B and satellite S (430 in FIG. 13), e.g. as computed by the calibration apparatus of FIG. 13 in "The Time Sync Application", $\varepsilon^{code}$—Pseudo-range sampling noise, $\varepsilon^{Phase}$—Carrier Phase sampling noise, $\delta t_{AB}$—Time difference between stations A and B, e.g. as computed by Equation 5 described below =AB time offset of FIG. 13.

Parameter $\rho_{AB}^S$ is known based on satellite and stations' positions. Parameters $I_{AB}^S$ and $T_{AB}^S$ are modeled using standard procedures such as described in the above described textbook Global Positioning System: Theory and applications, at Vol. II, Chapter 18, Eq. 12, at Vol. I, Chapter 11, Eq. 20, and at Eq. 32. Relative bias $B_{AB}$ is a difference between hardware delays measured once per each pair of stations. This results in the following equations, which may be solved by the Computation Unit 450 using least squares techniques for unknown Time Offset $\delta t_{AB}$ and $F_{AB}^S$ respectively (Equations C and D):

$$\tilde{P}_{AB}^S = \delta t_{AB} \cdot c + \varepsilon^{code} \quad (c)$$

$$\tilde{\Phi}_{AB}^S = \delta t_{AB} \cdot c + F_{AB}^S + \varepsilon^{Phase} \quad (d)$$

One method of operation for the nanosecond accuracy processing unit 460 of FIG. 13 is now described in detail. Based on Time Period which may be computed by the sensor in stations 410 and 420, e.g. as per Equation F as described in detail in "The Time Sync Application", and based also on Time Offset between stations' clocks as derived by Equations C and D, Processing Unit 450 computes a Relative Time Measurement $dT_{EVENT}^{AB}$, also termed herein the "time between events", between stations 410 and 420, e.g. as per following equation E:

$$dT_{EVENT}^{AB} = T_{PERIOD}^B - T_{PERIOD}^A + \delta t_{AB} \quad (e)$$

$dT_{EVENT}^{AB}$—Relative Time Measurement of event reception at stations A and B, also termed "precise relative time" or "time between events" (FIG. 13), $\delta t_{AB}$—Time Offset between station's clocks at sampling time, typically derived from Equations C and D by Computation Unit 450 as shown in FIG. 13.

$T_{PERIOD}^A$—Time Period between sensing of the external event (e.g. receiving of a pulse, originated by the active sensor and reflected by the flying object) by station A as described in "The Time Sync Application" (equation F). Also termed (e.g. in FIG. 13) "time period A", $T_{PERIOD}^B$—Time Period between sensing of the external event (e.g. receiving of a pulse, originated by the active sensor and reflected by the flying object) by station B as described in "The Time Sync Application" (equation F). Also termed (e.g. in FIG. 13) "time period B", The structure and operation of each station for detecting offset of 1 nanosecond is described in detail with reference to FIGS. 2-5 of the specified "Time Sync Application".

Figure 14:
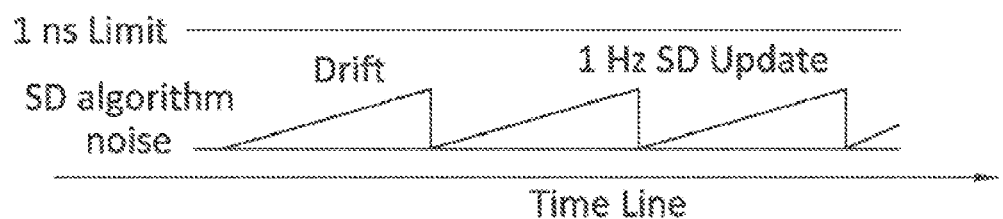
FIG. 14 is a chart illustrating synchronization results, in accordance with certain examples of the presently disclosed subject matter.

FIG. 14 shows the less than 1 nanosecond time offset.

Note that the said Relative Time Measurement is performed instantaneously and continuously at the desired events rate, depending upon the particular application.

Note also that the station in the specified application refers to a sensor of the present application, and that the time offset corresponds to the accuracy of a synchronized clock that is referred to in the present application.

Note also that the presently disclosed subject matter is not bound to achieving a time offset of up to 1 nanosecond in accordance with the teachings of "The Time Sync Application".

Note that the description with reference to FIGS. 13 and 14 describes achieving relative synchronization between two sensors at an accuracy of up to 1 nanosecond. The specified technique may be applied between any two sensors.

Note that the specified technique may be also applied between any passive sensor and the active sensor ("Star Configuration". The active sensor clock plays the role of "Master Clock").

Note also that the specified units 450 and 460 may form part of a synchronization unit forming part of the sensor array and may be implemented in module or module(s) that are integral with one or more of the specified sensors or separated therefrom.

Figure 15:
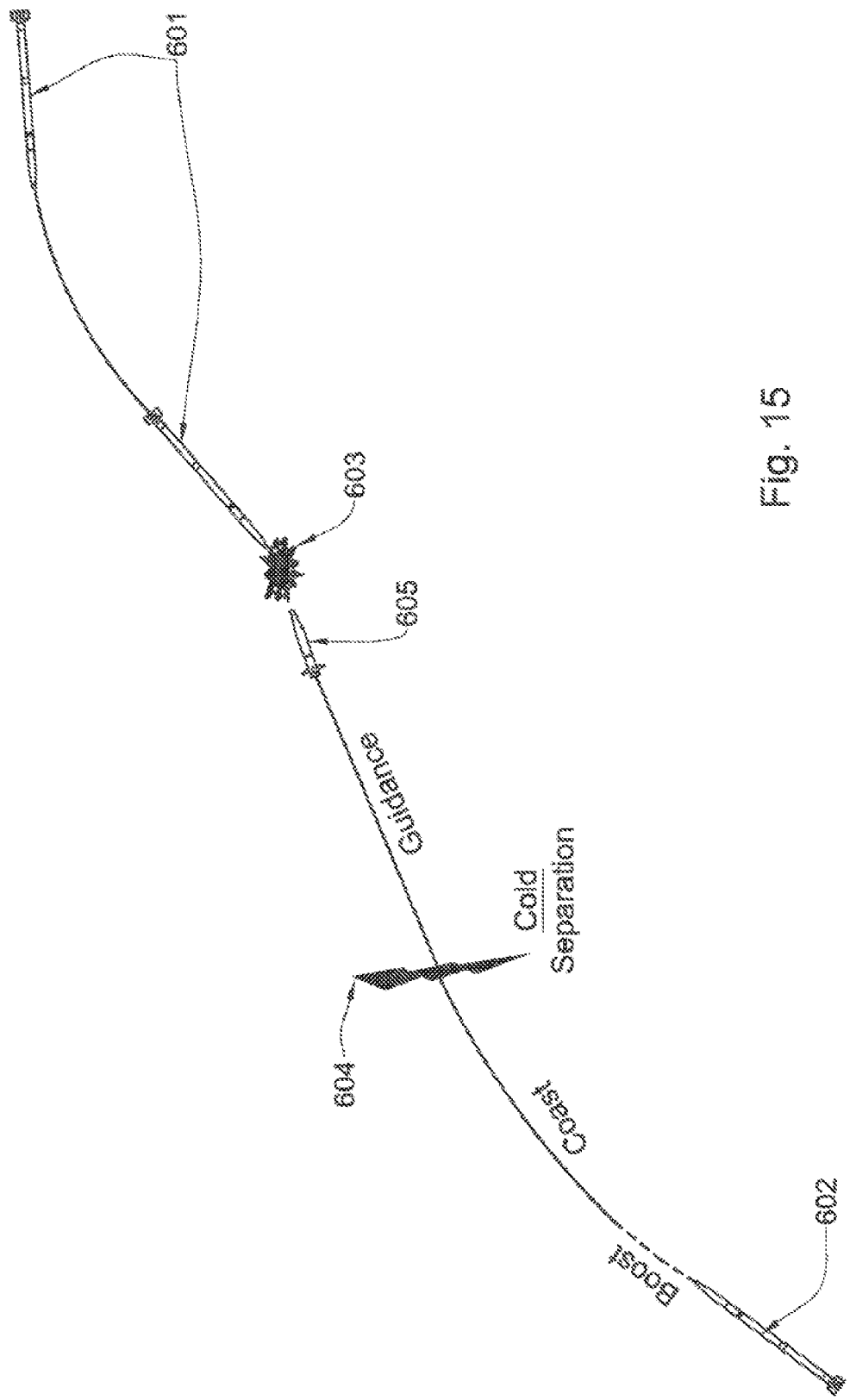
FIG. 15 illustrates a typical interception scenario, in accordance with certain examples of the presently disclosed subject matter.
Figure 16:
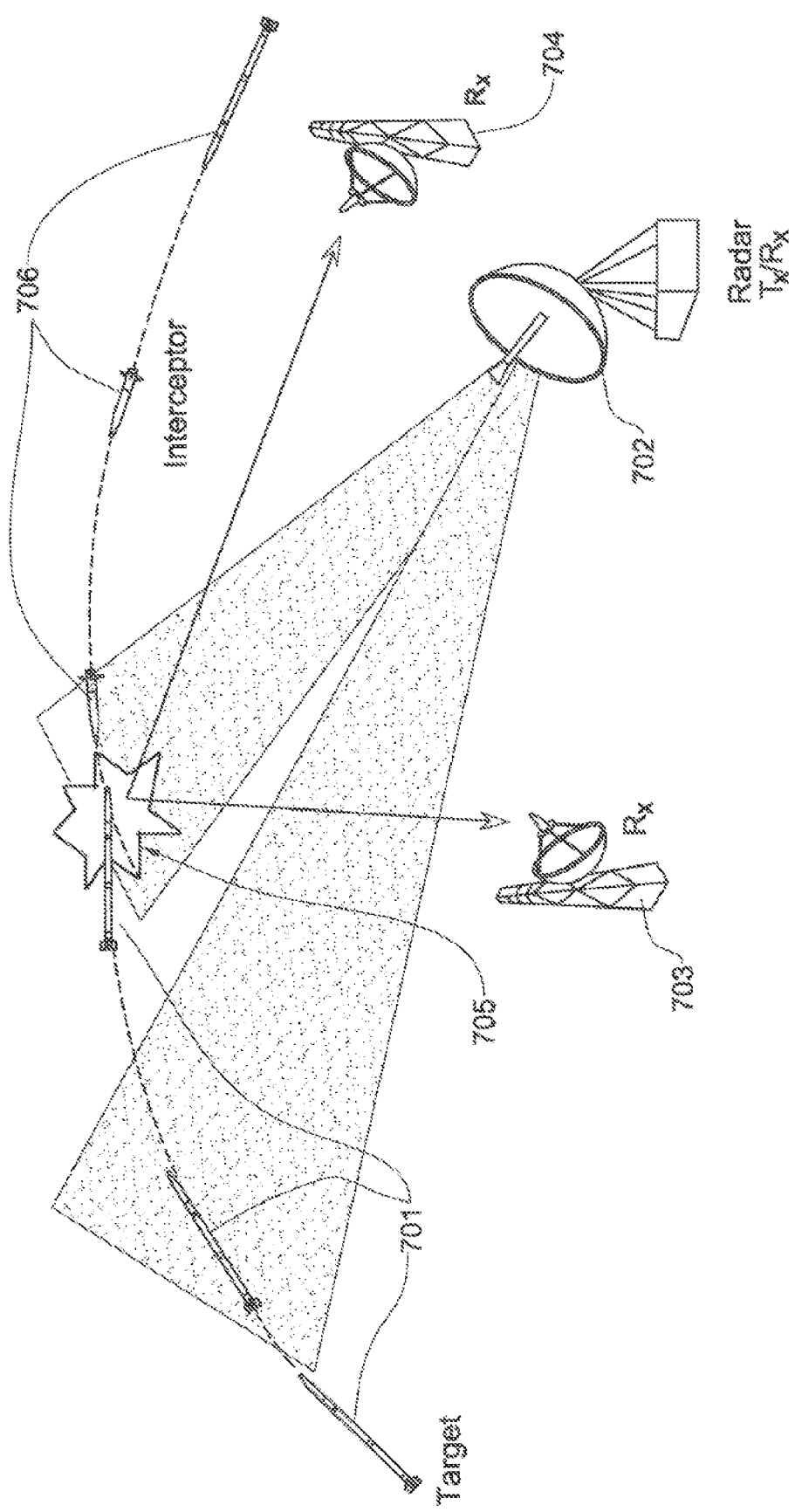
FIG. 16 illustrates an exemplary sensor array layout in an interception scenario, in accordance with certain examples of the presently disclosed subject matter.

Attention is now drawn to FIG. 15 illustrating a typical interception scenario, in accordance with certain examples of the presently disclosed subject matter and also to FIG. 16 illustrating an exemplary sensor array layout, in an interception scenario, in accordance with certain examples of the presently disclosed subject matter. Thus, a target rocket 601, 701 is detected and tracked at high accuracy utilizing the active sensor (e.g. radar 702) and the at least two passive sensors (703 and 704) (which in certain examples are utilized at a later stage of the target's flight, as discussed above), all being clock synchronized at a high accuracy of about 1 nanosecond, all as explained in detail above. The accurate updated location determination of the target is based, amongst others, on clock synchronization between the sensors, all as will be explained in greater detail below. Having accurately determined the updated location of the oncoming threat (601, 701) utilizing the specified sensors, the control system 304 (see FIG. 12A) is capable of calculating a planned flight trajectory of the interception missile (designated 602,605,706 in these figures) and updated Predicted Interception Point (PIP) (603,705) for interception the flying threat. The control system 304 (see FIG. 12A) is also capable of establishing the mission data (not shown), transferred to the interception launcher (not shown) and including at least a preliminary PIP (603), a needed time of launch and a time of the separation between the interception missile's boost stage 101 and carrier vehicle 102. Thereafter, the interception missile (602, 605,706) is launched (toward the PIP) and its updated location is accurately tracked by the specified sensors (702 to 704). As specified, the utilization of the passive sensor give rise to a more accurate mission data (e.g. PIP and separation time).

Note that the control system 304 (see FIG. 12A) can update the PIP (603,705) which is based on the updated locations of the both flying target and the interceptor.

The updated PIP (603) and updated location of the interceptor are transmitted from the control system 304 (see FIG. 12A) to the interceptor missile (602, 605,706) at a desired rate depending upon the particular application.

Note that updated location of the interceptor missile may be used by the navigation task of interceptor's airborne computer (e.g. 2004 at FIG. 3C).

Note also that both updated PIP and the updated location of the interceptor may be used by guidance task of interceptor's airborne computer 2004.

Once the separation condition is achieved: e.g. time of flight of interceptor missile meets the separation time condition transmitted from the ground control system 304, the booster stage 101 is separated and the carrier vehicle 102 of the interceptor missile 605 proceeds forward. At this stage the steering fins 107 are extracted and serve steering system for the diverting of the interceptor toward the Predicted Interception Point (PIP). Note that steering towards the PIP should be understood as encompassing also steering substantially towards the vicinity of the PIP or hitting it.

The airborne computer 2004 (see FIG. 3C) receives updated navigation data from the onboard inertial measurement unit and external measurement of interceptor location by uplink communication channel (using the communication system 2007—see FIG. 3C). Based on updated navigation solution and updated PIP (as received by the uplink communication system 2007—see FIG. 3C) the airborne computer propagates the guidance law (e.g. proportional navigation) and calculates appropriate steering commands for the steering system 2001-2003, see FIG. 3C (by the example utilizing steering fins 107 see FIG. 3A) that will guide the interceptor missile toward the updated PIP.

Note that the steering commands are updated based on the updated PIP and updated location and orientation of the interceptor missile.

Note also that in accordance with certain examples the steering commands may be executed after separation of the booster stage 101.

Note that In accordance with certain examples, the interceptor separation time that forms part of the mission data, may be updated by control system 304 (see FIG. 12A) during the flight of the interceptor via uplink communication channel 2007 (see FIG. 3C).

In accordance with certain examples, the guidance rules which control the steering of the missile towards the PIP may comply (but not necessarily) e.g. with a known per se proportional navigation paradigm.

Reverting now to FIGS. 15 and 16, once the interception missile (605, 701) is sufficiently close to the updated PIP, the proximity fuse (see 105 in FIG. 1) of the intercepting missile is activated (in response to a command originated by the airborne computer, or in accordance with a certain other example by the ground control system—see 304 in FIG. 12A and operates in a known per se manner. Thus, in accordance with certain examples, the proximity fuse acquires the needed information and once it concludes that the interceptor missile is sufficiently close to the warhead of the target, it triggers the fragmentation warhead of the interceptor missile which detonates the explosive (fitted in the warhead) and kills the target (601,701).

The target's warhead 1 will be neutralized colliding with and being penetrated by the fragments 355 with appropriate mass/density characteristics as disclosed above with reference to FIGS. 1 to 11.

It should be noted that in accordance with certain examples due to the relatively small dimensions of the voluntary area of the GTG rocket, the minimal required fragments' density is about one lethal fragment per square decimeter. Reliable interception of the target with a very small vulnerable area by an interceptor can be achieved only by very accurate estimation of the interception point (required miss distance is sub-meter level).

Note that the presently disclosed subject matter is not bound by the specified operational specifications which are provided for illustrative purposes only, and the latter may vary depending upon the particular application.

Note that using other MLRS solid motors for acceleration of the interceptor provides a capability for carrying of sufficiently larger warhead.

Note also that in accordance with certain examples any known per se lethality criteria for activating the warhead may be employed. Note that the lethality criterion may vary depending upon the nature of the target. Say, for rocket a different lethality criterion may be employed compared for instance to a UAV or aircraft.

Figure 17:
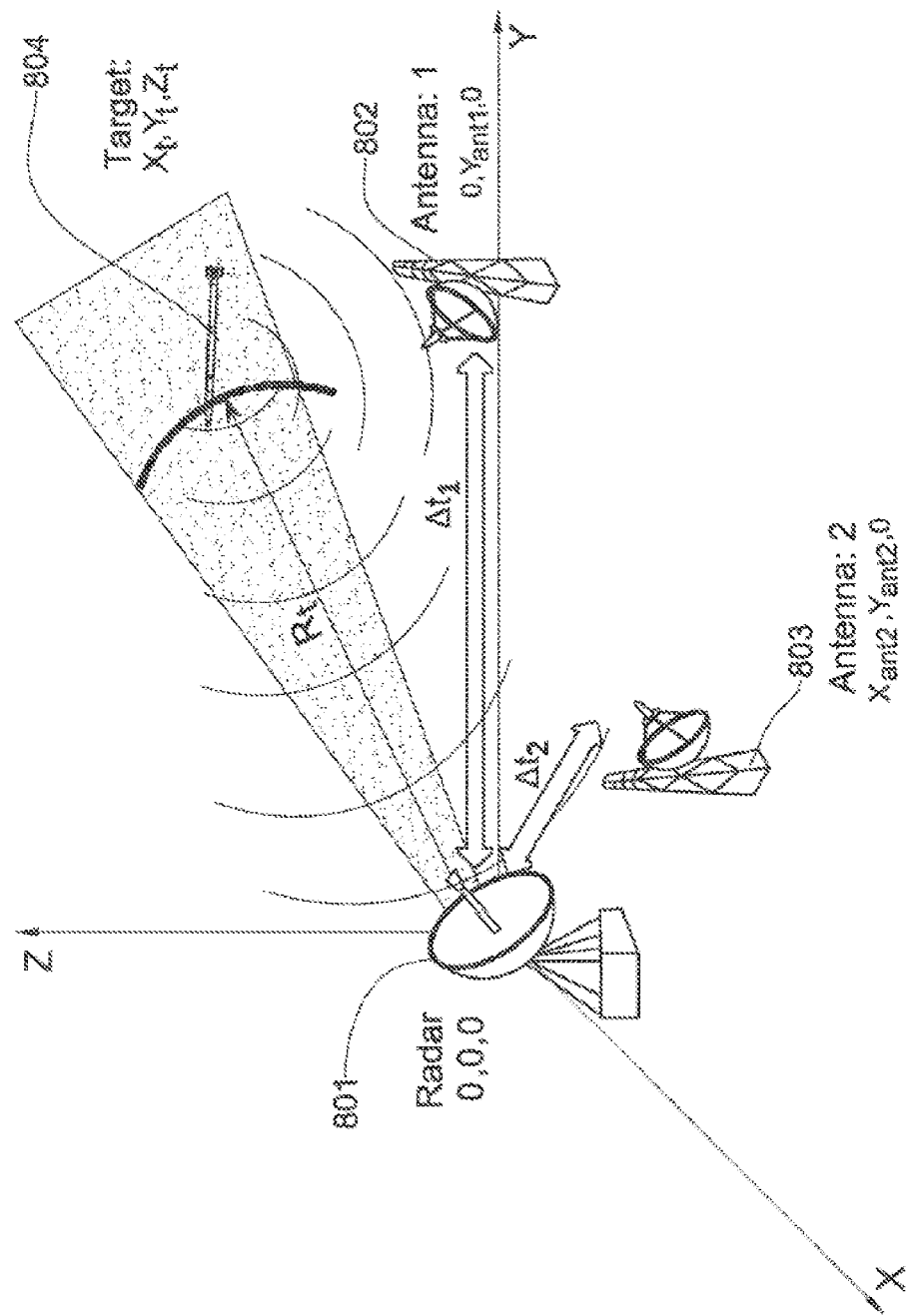
FIG. 17 illustrates a deployment scheme of a combined (radar and passive) sensor synchronized at a high accuracy, in accordance with certain examples of the presently disclosed subject matter.

Turning now to FIG. 17, it illustrates a deployment scheme of combined (radar and multi-static) sensor synchronized at a high accuracy of about 1 nanosecond, in accordance with certain examples of the presently disclosed subject matter.

Before turning to FIG. 17, it should be noted that Target location is measured by three independent highly accurate measurements:

Range ($R_t$) from Radar's location to target and is measured by the radar itself (at decimeter level), Time difference ($\Delta t_1$) the time difference between the reception times by the radar and antenna #1 of a signal that is emanated by the radar and reflected from the target. Note that the radar is located at origin of the coordinate system 801), the target is located at ($X_t$, $Y_t$, $Z_t$) 804 and antenna #1 is located at (0, $Y_{ant1}$, 0) 802. The time difference is measured by synchronization system (1 nanosecond level, equivalent to decimeter level measurement).

Time difference ($\Delta t_2$) the time difference between the reception times by the radar and antenna #2 of a signal that emanated by the radar and reflected from the target. Note that antenna #2 is located at ($X_{ant2}$, Yhd ant2, 0) 803.

The instantaneous target location is determined by using the known per se Time Difference Of signal Arrival (TDOA) technique (see for example TDOA Localization Techniques IEEE 802.15-04a/572r0 ieee802.org/ . . . /15-04-0572-00-004a-tdoa-localization-techniques.ppt, October 2004), combined with the measurements of range to target. The target location measurement uncertainty volume is an intersection of:

Spherical layer with radius of $R_t$ and thickness equal to uncertainty of range measurement Hyperbolical layer $\Delta t_1$=constant and thickness equal to product of light velocity and uncertainty of synchronization of reflection power receiving by the radar and the passive antenna #1.

Hyperbolical layer $\Delta t_2$=constant and thickness equal to product of light velocity and uncertainty of synchronization of reflection power receiving by the radar and the passive antenna #2.

Accuracy of target trajectory estimation may be approved by implementation of e.g. known per se filtering procedure (Kalman Filter). This method uses the multiple results of target location measurements and predefined models of target kinematic behavior.

Accuracy of instantaneous measurement may be approved by using of e.g. known per se TDOA-FDOA technique (noted above TDOA technique combined with Frequency Difference Of signal Arrival technique) that required additional measurements of frequency shifting by the Doppler Effect. Effectiveness of noted improvement depends on:

Stability of frequency sources used at radar and passive antennae sites,

Radar signal type and signal processing (resolution of Range Doppler map).

Target kinematic characteristics (velocity, spin rate, Radar Cross Section pattern etc.).

The form of the noted above uncertainty volume of target location depends on deployment of the radar and the passive antennae. The known per se technique of Geometric Dilution Of Precision—GDOP may be used (as an example) for optimization of divided sensor deployment (see for example Richard B. Langley (May 1999). "Dilution of Precision". GPSWorld. http://gauss.gge.unb.ca/papers.pdf/gpsworld.may99.pdf.

The special case of the plane deployment of the divided sensor is analyzed below. In this case all parts of the sensor array (radar and pair of passive antennae) are ground based and as a result the elongation of Vertical Dilution Of Precision (VDOP) is expected.

Figure 18:
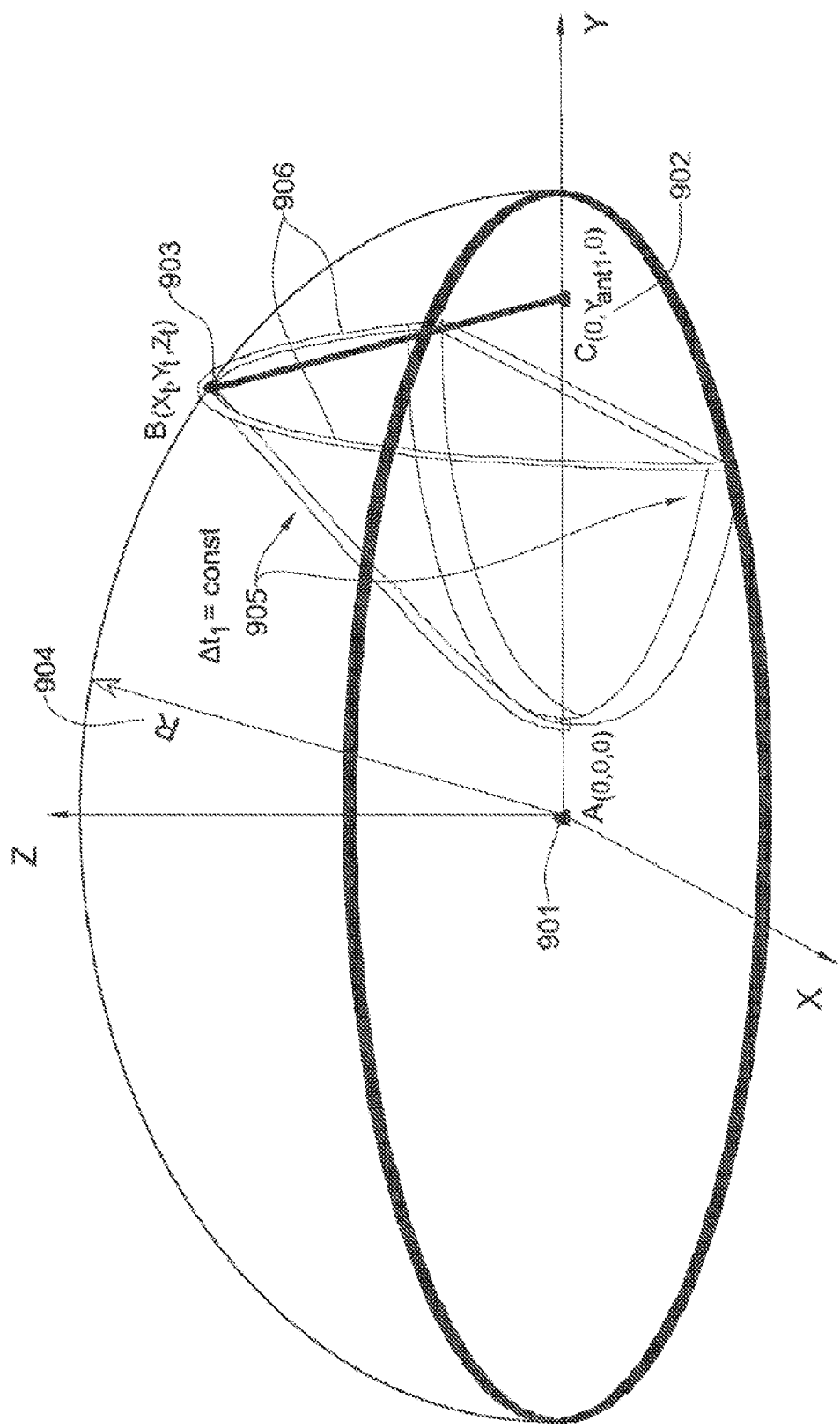
FIGS. 18, 18A, 18B illustrate measurement of target at Y coordinate.
Figure 18A:
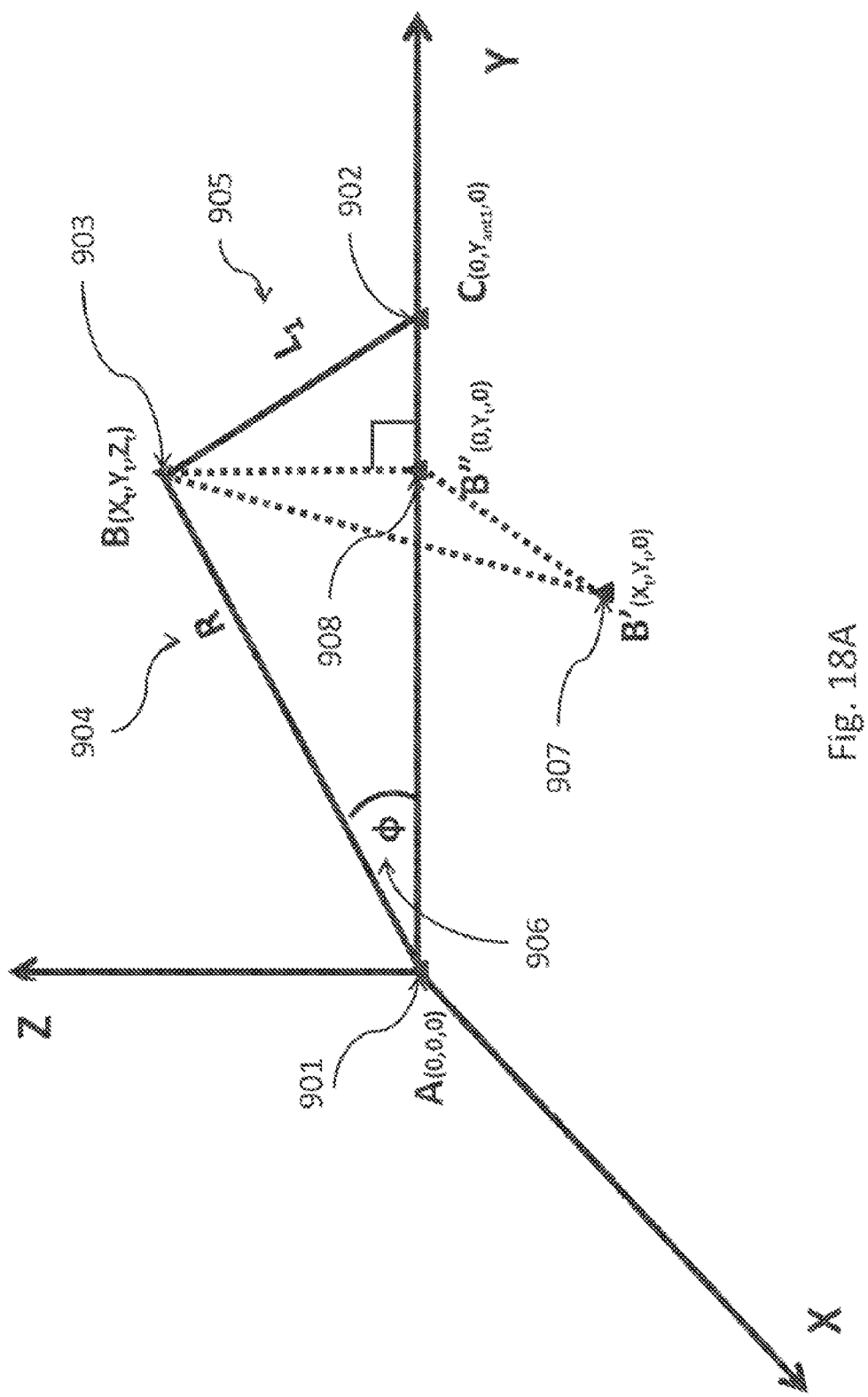
Figure 18B:
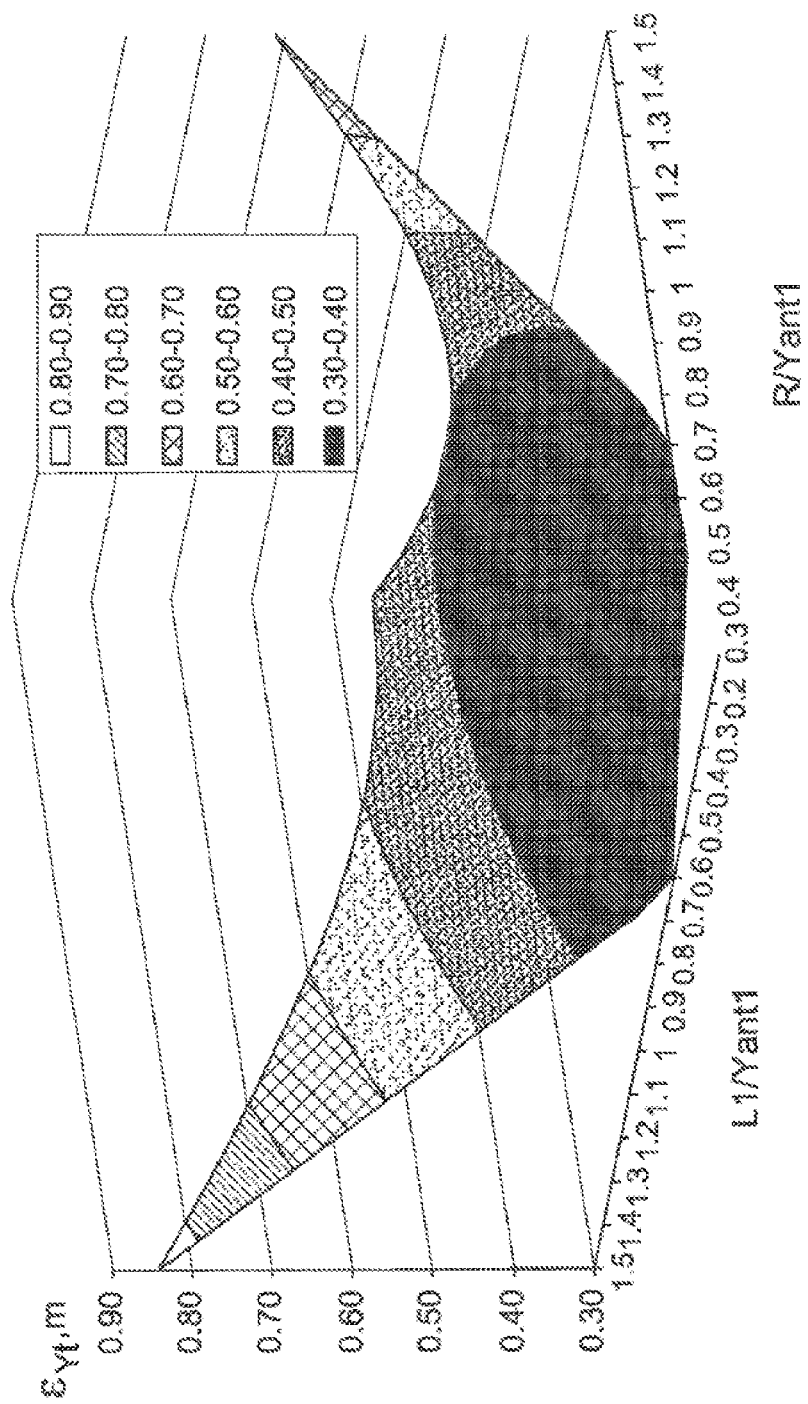

A method for calculation of a Y-coordinate of the target is illustrated by FIGS. 18, 18A and 18B. The noted above spherical layer with radius R (904) is generated by a range measurement by radar A (901) placed at a head of a coordinate system XYZ. The hyperbolic layer $\Delta t_1$=constant (905) is a place of points with the constant difference of the distances to the radar A (901) and a passive antenna C (902). The intersection between the noted sphere and hyperbolic layers generates a ring (906) of possible positions of a target B (903). Turning now to FIG. 18A, a triangle ABC is generated by a radar site A (901), 1st passive antenna site C (902) and a target B (903). The length of side AB is equal to range R (904), accurately measured by the radar, the length of side AC is equal to "Y" coordinate of 1-st passive antenna site $Y_{ant1}$ and the length of side BC (905) is equal to a distance $L_1$ of a traveling path of reflected by the target RF energy, originated by the radar. An angle $\varphi$ (906) is an angle BAC between side AB and AC (Y-axes). A point B' (907) is a projection of the target B on the XY-plane. Equation (1) presents a trigonometric relationship (cosines law) for ABC triangle:

$$R^2 + Y_{ant1}^2 - 2 \cdot R \cdot Y_{ant1} \cdot \cos(\varphi) = L_1^2 \tag{1}$$

The term $\cos(\varphi)$ can be calculated by ratio $$\frac{AB''}{R},$$

here B" (908) is projection of point B on the Y axes (AB"=$Y_T$).

$$R^2 + Y_{ant1}^2 - 2 \cdot Y_{ant1} \cdot Y_T = L_1^2 \tag{2}$$

The distances R and R-$L_1$ are measured accurately by the sensor array. The noted above time difference ($\Delta t_1$) between receiving of the reflected by the target RF energy by the radar and the passive antenna #1 is connected to the distance R-$L_1$ by following relationship:

$$R-L_1 = c \cdot \Delta t_1, \text{ or } L_1 = R - c \cdot \Delta t_1 \tag{3}$$

Here c is a speed of light

Substituting of obtained terms for $L_1$ (equation 3) into relationship (2) provides the following equation for a Y-coordinate of a target:

$$Y_T = \frac{Y_{ant1}^2 - c^2 \Delta t_1^2}{2 \cdot Y_{ant1}} + \frac{R}{Y_{ant1}} \cdot c \cdot \Delta t_1 \tag{4}$$

Note that for obtaining a Y coordinate of the target $Y_T$ only 2 accurate measurements of the sensor array were used: range to target R and time difference between receiving of reflected by target RF energy by the radar and by the first passive antenna ($\Delta t_1$).

First order approximation of an accuracy of target's Y coordinate ($\varepsilon_{Y_t}$) determination is presented by the following equation:

$$\varepsilon_{Y_t} \sim \frac{c}{Y_{ant1}} \cdot \sqrt{(\varepsilon_{t \cdot L_1})^2 + (\varepsilon_R + \Delta t_1)^2} \tag{5}$$

Here $\varepsilon_t$ and $\varepsilon_R$ are independent accuracies of the measurements of time difference and a range correspondingly.

The following rule provides a capability for a decimeter level accuracy determination of the Y coordinate of the target: the first passive antenna should be placed close to the area of potential interception points ($L_1 \sim Y_{ant1}$) and relatively far from the radar site ($Y_{ant1} \sim R_t$).

FIG. 18B illustrates a dependency of the accuracy of determination of the Y coordinate of the target on the main parameters of the radar and passive antenna deployment ($L_1/Y_{ant1}$ and $R_t/Y_{ant1}$). The noted above accuracy is kept on the level of 0.5-0.6 in the case of $L_1/Y_{ant1}<1.5$ & $R_t/Y_{ant1}<1.5$.

Note that the discussion with reference to FIGS. 17 and 18, 18A, 18B is provided for illustrative purposes and accordingly those versed in the art will readily appreciated that various numerical and specific parameters that were described are by no means binding.

Figure 19:
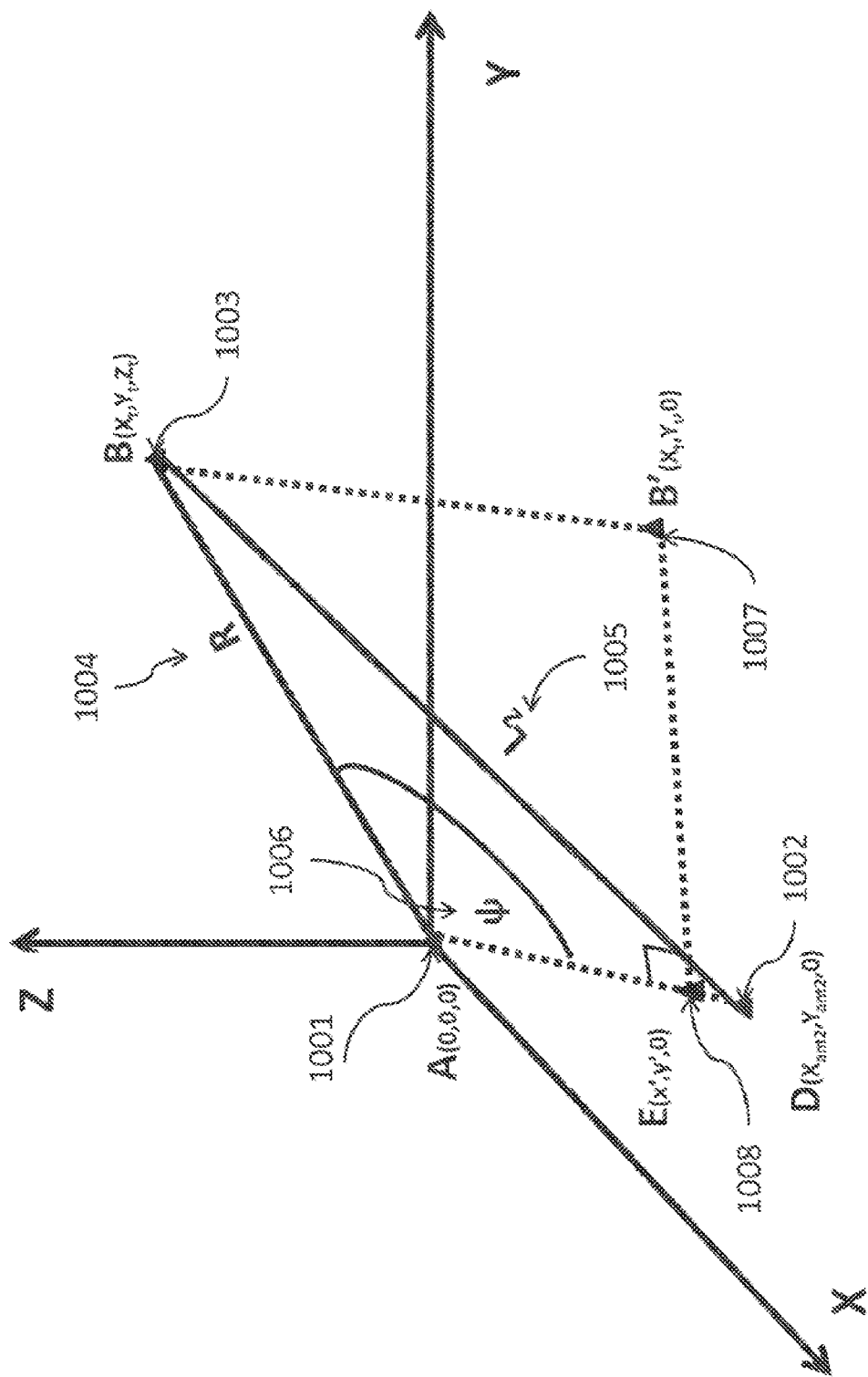
FIG. 19 illustrates measurement of target at X coordinate.

FIG. 19 illustrates a method for calculation X-coordinate of the target. A triangle ABD is generated by a radar site 1001, 2-nd passive antenna site 1002 and a target 1003. The length of site AB is equal to range R (1004), accurately measured by the radar, the length of site AD is equal to distance of 2-nd passive antenna site from the radar site $\sqrt{(X_{ant2}^2 + Y_{ant2}^2}$ and the length of site DC (1005) is equal to a distance $L_2$ of a traveling path of reflected by the target RF energy emanated by the active sensor 1001. A point B' (1007) is a projection of the target B on the XY-plane. Equation (6) presents a well known trigonometric relationship (cosines law) for ABD triangle:

$$R^2 + X_{Ant2}^2 + Y_{Ant2}^2 - 2 \cdot R \cdot \sqrt{(X_{ant2}^2 + Y_{ant2}^2)} \cdot \cos(\psi) = L_2^2 \qquad (6)$$

The term $\cos(\psi)$ can be calculated by ratio $$\frac{AE}{R},$$

here E (1008) is projection of point B' to the site AD:

$$AE = \frac{X_t \cdot X_{ant2} + Y_t \cdot Y_{ant2}}{\sqrt{X_{ant2}^2 + Y_{ant2}^2}} \qquad (7)$$

Equation (8) presents the relationship for calculation the X coordinate of the target:

$$X_T = \frac{X_{ant2}^2 + Y_{ant2}^2 - c^2 \cdot \Delta t_2^2}{2 \cdot X_{ant2}} + \frac{R \cdot c \cdot \Delta t_2}{X_{ant2}} - \frac{Y_t \cdot Y_{ant2}}{X_{ant2}} \qquad (8)$$

The range R and the time difference $\Delta t_2$ are measured accurately by the sensor array. The Y coordinate of the target $Y_t$ is determined by equation (4).

Note that for obtaining of a X coordinate of the target $X_T$ all 3 accurate measurements of the divided ground sensor were used:

Range to target R,

Time difference between receiving of reflected by the target RF energy by the radar and by the first passive antenna ($\Delta t_1$) for obtaining the Y coordinate of the target.

Time difference between receiving of reflected by the target RF energy by the radar and by the second passive antenna ($\Delta t_2$).

First order approximation of an accuracy of target's X coordinate ($\varepsilon_{X_t}$) determination is presented by following equation:

$$\varepsilon_{X_t} \sim \sqrt{\frac{c^2}{X_{ant2}^2} \cdot (\varepsilon_t^2 \cdot L_2^2 + \varepsilon_R^2 \cdot \Delta t_2^2) + \frac{Y_{ant2}^2}{X_{ant2}^2} \cdot \varepsilon_{Y_t}^2}, \qquad (9)$$

Here $\varepsilon_t$ and $\varepsilon_R$ are accuracies of the measurements of time difference and range correspondingly.

The following rule provides capability for a decimeter level accuracy determination of the X coordinate of the target: the second passive antenna should be placed close to X-axes of the chosen coordinate system ($Y_{ant2} \ll X_{ant2}$). In this case the relationship for the uncertainties of determining of X coordinate of the target has the following form:

$$\varepsilon_{X_t} \sim \frac{c}{X_{ant2}} \cdot \sqrt{\varepsilon_t^2 \cdot L_2^2 + \varepsilon_R^2 \cdot \Delta t_2^2}, \qquad (10)$$

In the case of orthogonal deployment of the combined radar and multi static array ($Y_{ant2}=0$), the expression for the accuracy of determination of the X coordinate of the target (10) is similar to the expression for the accuracy of determination of the Y coordinate of the target (5). In accordance with certain examples, the following rule provides a capability for a decimeter level accuracy determination of the X coordinate of the target:

the second passive antenna should be placed relatively far from the radar site ($X_{ant2} \sim R_t$) and relatively close to the area of potential interception points ($X_{ant2} \sim L_2$). Dependency of the accuracy of determination of X coordinate of the target on the main parameters of second passive antenna deployment is similar to the dependency of the accuracy of Y coordinate: the noted above accuracy is kept on the level of 0.5-0.6 in the case of $L_2/Y_{ant2} < 1.5$ & $R_t/Y_{ant2} < 1.5$ (see FIG. 9B).

$R_t/X_{ant2}$, $L_2/X_{ant2}$ In the case of non-orthogonal deployment of the combined radar and multi static array, the expression for the accuracy of determination of the X coordinate of the target (9) includes additional term $$\left(\frac{Y_{ant2}^2}{X_{ant2}^2} \cdot \varepsilon_{Y_t}^2\right).$$

This term decreases the accuracy of determination of the X coordinate of the target. For example, in the case of deployment of the passive antennae with the angle of 60° in respect to the radar ($Y_{ant2}^2/X_{ant2}^2 = (1/\tan 60°)^2 = 1/3$, the accuracy of determination of X coordinate of the target will be about 15% $\sqrt{1.333} - 1$, worse relatively to the optimal orthogonal deployment.

Substituting of obtained terms for $Y_t$ (equation 5) and $X_t$ (equation 8) coordinates of the target into the equation for the range allows calculation of the last target coordinate ($Z_t$):

$$Z_t = \sqrt{R_t^2 - Y_t^2 - X_t^2} = \qquad (11)$$

$$\sqrt{R_t^2 - \left(\frac{\frac{1}{2} \cdot (X_{ant2}^2 + Y_{ant2}^2 - c^2 \cdot \Delta t_2^2) + R \cdot c \cdot \Delta t_2 - Y_t \cdot Y_{ant2}}{X_{ant2}}\right)^2 - \left(\frac{\frac{1}{2} \cdot (Y_{ant1}^2 - c^2 \cdot \Delta t_1^2) + R \cdot c \cdot \Delta t_1}{Y_{ant1}}\right)^2}$$

If the sensor array is deployed according to the formulated above rules: $Y_{ant1} \sim R_t$, $X_{ant2} \sim R_t$, $Y_{ant2} \ll Y_{ant1}$, the equation for Z-coordinate of the target has the following form:

$$Z_t = \sqrt{R_t^2 - \left(\frac{\frac{1}{2} \cdot (X_{ant2}^2 - c^2 \cdot \Delta t_2^2) + R \cdot c \cdot \Delta t_2}{X_{ant2}}\right)^2 - \left(\frac{\frac{1}{2} \cdot (Y_{ant1}^2 - c^2 \cdot \Delta t_1^2) + R \cdot c \cdot \Delta t_1}{Y_{ant1}}\right)^2} \qquad (11')$$

An accuracy of determination Z coordinate of the target can be estimated by the following equation:

$$\varepsilon_Z = \frac{Z_{max}^2 - Z_{min}^2}{2 \cdot Z_t} = \frac{(R_{max}^2 - X_{min}^2 - Y_{min}^2) - (R_{min}^2 - X_{max}^2 - Y_{max}^2)}{2 \cdot Z_t} = \qquad (12)$$

-continued
$$\frac{R_t}{Z_t}\cdot\varepsilon_R + \frac{X_t}{Z_t}\cdot\varepsilon_X + \frac{Y}{Z_t}\cdot\varepsilon_Y,$$

Accuracy of the target's Z-coordinate determination improves with the increasing of the targets altitude ($Z_t$), that is why an interception of the target close to its apogee is preferable.

High acceleration during the interceptor missile boost phase can significantly improve a system time budget. Rocket solid motors (for example, the motor of GRAD or MLRS rockets) are usually designed for extremely short burning time and can be useful as a low cost propulsion part of the interceptor.

Equation 13 outlines a different form of equation 12:

$$\varepsilon_Z = \frac{R_t}{Z_t}\cdot\varepsilon_R + \frac{X_t}{Z_t}\cdot\varepsilon_X + \frac{Y_t}{Z_t}\cdot\varepsilon_Y \qquad (13)$$

What remains to finalize the deployment of the sensor's array layout is the location of the active sensor (e.g. radar).

As before, it is desired to reduce $\varepsilon_z$ (see equation 13) in order to secure hitting the target. Before moving on, it is recalled that shortly after the detection of the flying GRAD threat, the interceptor missile (e.g. powered by GRAD or MLRS motor) is launched towards the target from a launching site. Both fly at substantially the same speed and substantially along known trajectories, which substantially prescribe the predicted interception point.

Reverting to equation 13, the lower the expression $R_t/Z_t$, the larger the $\varepsilon_z$ (the other variables including $Z_t$ are substantially known). This stipulates that the target range $R_t$ should be smaller. Assuming that by certain examples the radar cannot view backwardly, then the most advantageous location would be substantially underneath the predicted interception point. In certain examples, the radar can view backwardly, implying thus that it can be deployed farther than the PIP.

In an exemplary interception scenario the target acquisition starts at the relatively low ascent part of target trajectory (elevation angle of the target is less 20 degrees, $R_t/Z_t \sim 3\div10$). The contribution of the passive antennae array to the improving of the target location accuracy is limited by factor $R_t/Z_t$. It is sufficient for the definition of PIP, generation of mission data and launching of the interceptor towards the PIP but not enough for meeting the lethality criterion for destroying the target (e.g. hitting the target). Along the target trajectory the elevation angle of radar beam rises up and e.g. at the apogee of the target can reach about 45 degrees ($R_t/Z_t \sim 1.4$). As a result, the accuracy of the measurement of the target location significantly improves: the expected accuracies of determination of X and Y coordinates of the target location (according to the equations 5 and 10) are close to the 0.5÷1 meter and of Z coordinate of the target (according to the equation 13) is close to 2÷2.5 meter. At the descent part of the target trajectory the elevation angle of the radar beam increases continuously and can reach e.g. about 60 degrees at the region of potential interception points ($R_t/Z_t \sim 1.15$). The measurements of X and Y coordinates remain to be very accurate (0.5÷1 meter level) and accuracy of measurement of Z coordinate of the target reaches level of 1.5÷2 meter. The volume of uncertainty of target location is small enough (1÷2 m$^3$) for secure hitting of the target warhead by the beam of fragments generated by the interceptor with relatively small warhead. Note that the presently disclosed subject matter is not bound by the specified exemplary scenario and in particular not by the specific numerical parameters outlined in the scenario.

The net effect is this that optimal deployment in accordance with certain examples of the presently disclosed subject matter stipulates that the first passive antenna will be deployed in the direction that falls in the sector from which the oncoming threat is likely to arrive and at coordinates $(0,Y_{ant1},0)$. The direction is from the active sensor to the first antenna. The second antenna will be deployed close to perpendicular direction e.g. at coordinates ($X_{ant2}$, $Y_{ant2}$,0,) where $Y_{ant2} \ll Y_{ant1}$ and that the radar will be placed as far as possible, preferably (in the case of a radar that is devoid of backward view) underneath the predicted interception point (and in the case of backwardly viewing radar, further than the PIP) in order to decrease the range to target R and that $Y_{ant1} \sim R_t$ and $X_{ant2} \sim R_t$. Note that "~" is indicative of up to say 1.5 times, e.g. if the range to target from the radar site is 15 Km than the distances $Y_{ant1}$ and $X_{ant2}$ could be at least 10 Km.

Note that the discussion with reference to FIG. 19 is provided for illustrative purposes and accordingly those versed in the art will readily appreciated that various numerical and specific parameters that were described are by no means binding.

Figure 20A:
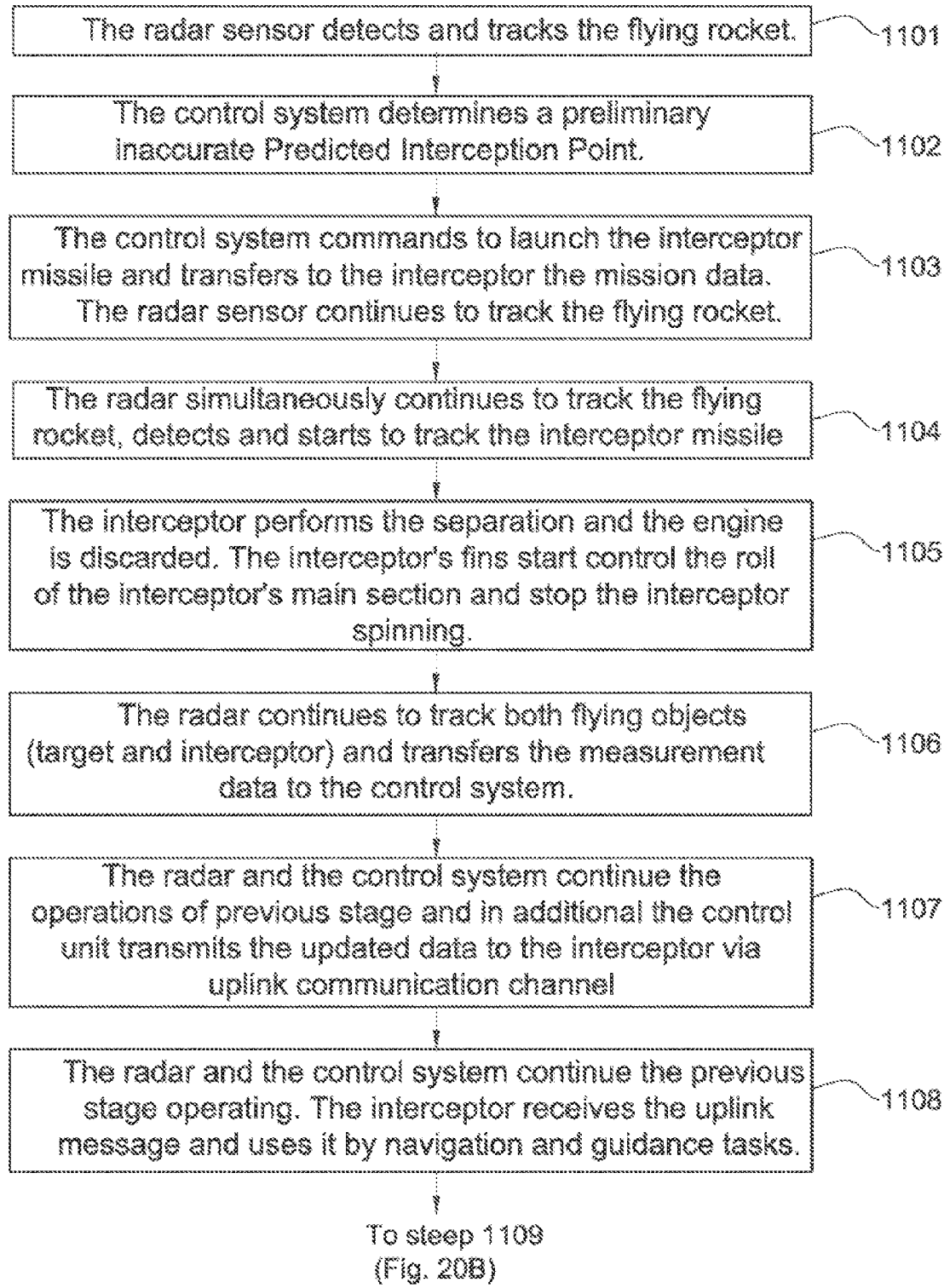
FIG. 20A and FIG. 20B illustrate a sequence of operations, in accordance with certain examples of the presently disclosed subject matter.
Figure 20B:
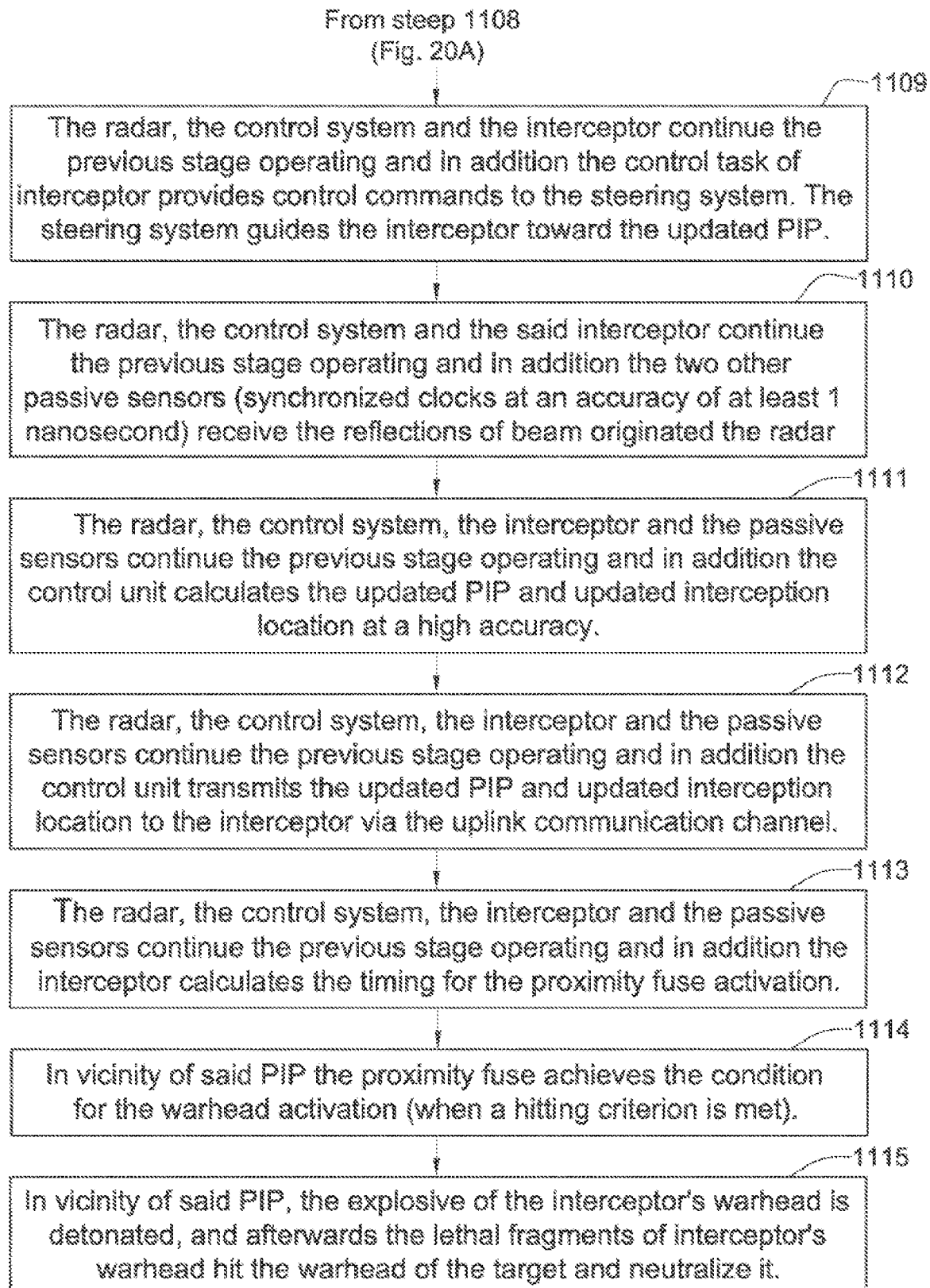

Turning now to FIG. 20 it illustrates a sequence of operations, in accordance with certain examples of the presently disclosed subject matter.

Thus, at stage 1101, the radar sensor detects and tracks the flying rocket.

At stage 1102 the control system determines a preliminary inaccurate Predicted Interception Point.

At stage 1103 said control system commands to launch the interceptor missile and transfers to the interceptor the mission data that includes at least required time of launch, inaccurate PIP and required time of interceptor separation. The radar sensor continues to track the flying rocket.

At stage 1104 the radar simultaneously continues to track the flying rocket, detects and starts to track the interceptor missile. The radar sensor transfers the measurement data (tracks) to the said control system. The control system calculates the updated the target rocket and interceptor missile state vectors (locations and velocities) as well as updated predicted interception point.

At stage 1105 the interceptor performs the separation and the engine is discarded. The interceptor's fins start control the roll of the interceptor's main section and stop the interceptor spinning. Interceptor's uplink receiver is ready for communication.

At stage 1106 the radar continues to track both flying objects (target and interceptor) and transfers the measurement data to the control system. The control system continues updating the state vectors of the target and interceptor and calculates the updated PIP.

At stage 1107 the radar and the control system continue the operations of the previous stage, and, in addition, the control unit transmits the updated data to the interceptor via uplink communication channel. The uplink message includes at least updated location of the interceptor missile (using by navigation task of the airborne computer of the interceptor missile) and updated PIP (using by the guidance task of the airborne computer of the interception missile).

At stage 1108 the radar and the control system continue operation of the previous stage. The interceptor receives the uplink message and uses it by implementing navigation and guidance tasks.

At stage 1109 the radar, the control system and the interceptor continue operation of the previous stage and in addition the control task of interceptor provides steering commands to the steering system. The steering system guides the interceptor toward the updated PIP.

At stage 1110 the radar, the control system and the said interceptor continue operating of the previous stage and in addition the two other passive sensors (synchronized clocks at an accuracy of at least 1 nanosecond) receive the reflections of beam originated by the radar. The time differences between receiving the echo by the radar, and by the passive sensors, is transferred to the control system.

At stage 1111 the radar, the control system, the interceptor and the passive sensors continue operating the previous stage and in addition the control unit calculates the updated PIP and updated interception location at a high accuracy.

At stage 1112 the radar, the control system, the interceptor and the passive sensors continue operating the previous stage and in addition the control unit transmits the updated PIP and updated interception location to the interceptor via the uplink communication channel.

At stage 1113 the radar, the control system, the interceptor and the passive sensors continue operating the previous stage and in addition the interceptor calculates the timing for the proximity fuse activation.

At stage 1114 in vicinity of said PIP the proximity fuse achieves the condition for the warhead activation (when a hitting condition is met).

At stage 1115 in vicinity of said PIP, the explosive of the interceptor's warhead is detonated, and afterwards the lethal fragments of interceptor's warhead hit the warhead of the target and neutralize it.

Figure 12B:
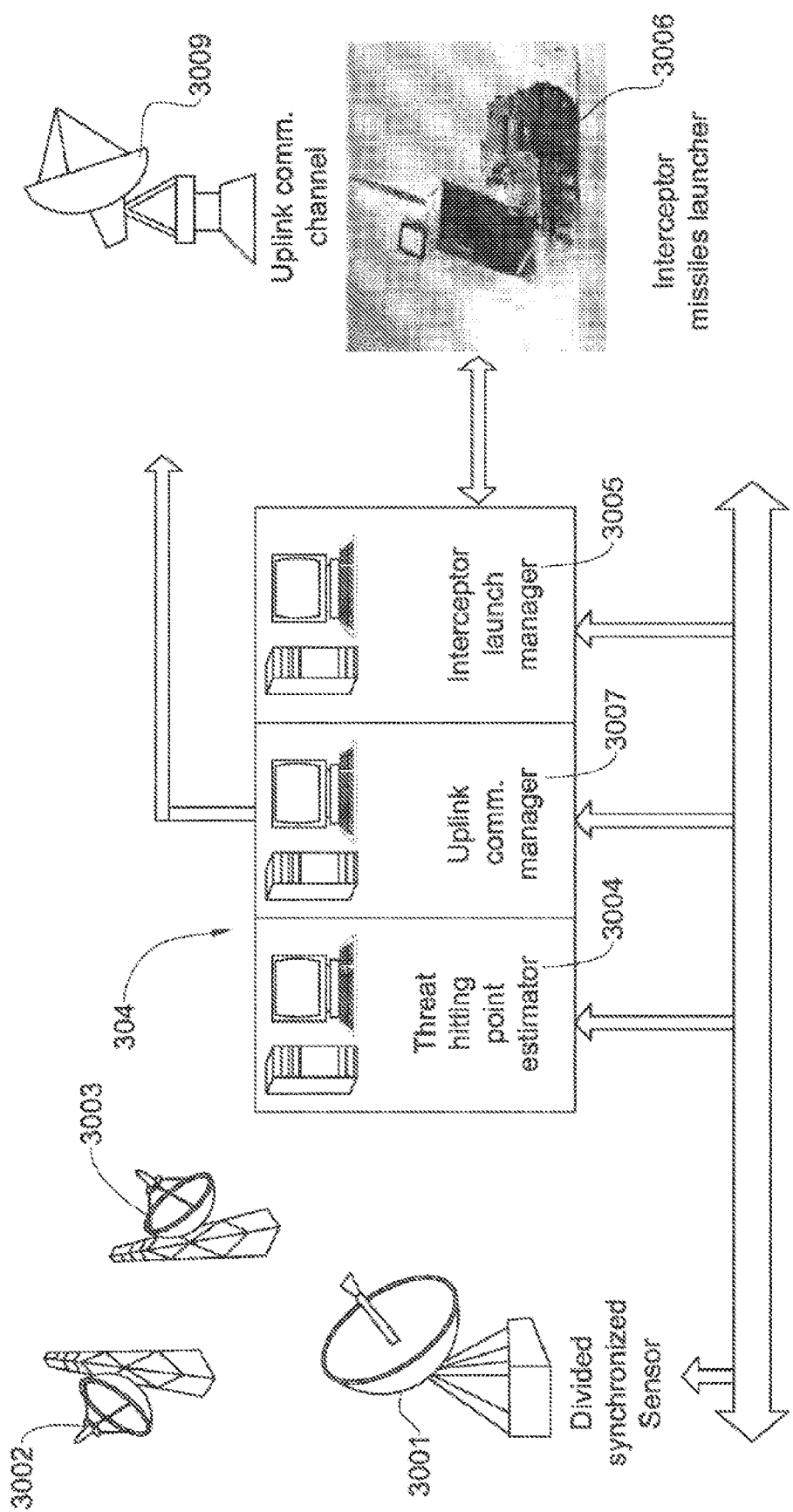
FIG. 12B illustrates ground control system architecture, in accordance with certain examples of the presently disclosed subject matter.

Note that the system architecture FIGS. 3C, 12B, 13, are provided for illustrative purposes only and are by no means biding. Accordingly, the system architecture of each of the specified drawings may be modified by consolidating two or more blocks/modules/units/systems and/or by modifying at least one of them and or by deleting at least one of them and replacing by one or more others, all as required and appropriate, depending upon the particular implementation.

Note that the flow chart illustrating sequence of operation in FIG. 20 is provided for illustrative purposes only and is by no means biding. Accordingly, the operational stages may be modified by consolidating two or more stages and/or by modifying at least one of them and or by deleting at least one of them and replacing by one or more others, all as required and appropriate, depending upon the particular implementation.

Unless specifically stated otherwise, as apparent from the following discussions, it is appreciated that throughout the specification discussions utilizing terms such as "achieving", "generating", "updating", "utilizing" and "activating" or the like, include actions and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and/or any combination thereof.

The operations in accordance with the teachings herein may be performed by a computer specially constructed for the desired purposes or by a general purpose computer specially configured for the desired purpose by a computer program stored in a computer readable storage medium.

Alternatively, any suitable target detection and tracking system can be used for providing the carrier vehicle 102 with data relating to the PIP of the flying object, and relating to the state vectors of the carrier vehicle and of the flying object, to enable guiding of the carrier vehicle 102 to the PIP. For example, such target detection and tracking system can include, in other alternative variations of the above examples, an on-board homing sensor (e.g. RF seeker, electro optical sensors, and so on) that autonomously detect and track the flying object.

It is also to be noted that the fragmentation warhead and carrier vehicle according to examples of the presently disclosed subject matter can also be used for different targets, for example different types or rockets or missiles, UAV's, manned aircraft, cruise missiles, and so on, as well as non-flying objects, for example ground vehicles or marine vehicles, or static structures, such as for example Radar antennas and so on. For example, the closely spaced fragments provided by each set of fragments after ejection from the fragmentation warhead can provide severe weakening of a mechanical structure along a particular direction, which can result in the failing or collapse of the structure due to mechanical or aerodynamic loads on the weakened structure.

It is also to be noted that in another alternative variations of the above examples, the interception missile can be configured for being air-launched, for example by a carrier aircraft.

In the method claims that follow, alphanumeric characters and Roman numerals used to designate claim steps are provided for convenience only and do not necessarily imply any particular order of performing the steps.

It should be noted that the word "comprising" as used throughout the appended claims is to be interpreted to mean "included but not limited to".

Whilst some particular examples have been described and illustrated with reference to some particular drawings, the artisan will appreciate that many variations are possible which do not depart from the general scope of the presently disclosed subject matter, mutatis mutandis.

The invention claimed is:

1. An interception missile, comprising:
   a fragmentation warhead configured for being maneuvered to a predicted interception point (PIP) for intercepting within a probability envelope a flying object having a kill zone of known dimensions, the fragmentation warhead being configured for selectively providing a plurality of fragments directed towards said probability envelope such that the spacing between any two adjacent said fragments within the probability envelope is less than at least one of said known dimensions to ensure that at least one said fragment impacts said kill zone within said probability envelope, wherein each said fragment is capable of neutralizing the flying object by impacting said kill zone;
   wherein the fragmentation warhead is configured for providing said plurality of fragments in the form of at least one set of serially adjacent said fragments in generally helical relationship with respect to a longitudinal axis of the fragmentation warhead.

2. The interception missile according to claim 1, wherein said kill zone has a length of 0.50 m and a width of 0.10 m.

3. The interception missile according to claim 1, wherein said flying object is any one of: a rocket, a GRAD rocket; a UAV, a manned air vehicle, or a cruise missile.

4. The interception missile according to claim 1, wherein the fragmentation warhead has a longitudinal axis and includes:
  a shell extending along said longitudinal axis and comprising a fixed shell portion and a fragmentation portion, and defining therebetween a cavity for accommodating therein an explosive charge;
  wherein the fragmentation portion comprising said at least one set of serially adjacent fragments in correspondingly serially contiguous relationship in the fragmentation portion and in generally helical relationship with respect to the longitudinal axis.

5. The interception missile according to claim 4, wherein each said set of serially adjacent fragments in correspondingly serially contiguous relationship in said fragmentation portion and in generally helical relationship with respect to the longitudinal axis is oriented at predetermined helix angle with respect to said longitudinal axis.

6. The interception missile according to claim 5, wherein said helix angle is predetermined such that upon said detonation, the respective said fragments of each said set are spread over an imaginary cylindrical surface along a distance of between about 2 m to about 4 m over said cylindrical surface, at a corresponding radial distance of between 4 m and 8 m, respectively, from said longitudinal axis, while ensuring a spacing of not greater than 0.1 m between adjacent fragments at said radial distance.

7. The interception missile according to claim 4, wherein said fragmentation portion is formed as a plurality of axially serially adjacent fragmentation portion sections, each said fragmentation portion section comprising a plurality of said fragments in lateral contiguous relationship, and wherein said plurality of fragments of each successive said fragmentation portion section along said longitudinal axis is angularly displaced about the longitudinal axis with respect to the respective said plurality of fragments of the previous said fragmentation portion section.

8. The interception missile according to claim 4, wherein said fragmentation portion is formed as a generally helical band with respect to said longitudinal axis, and wherein said fixed shell portion comprises a generally helical slot complementary to said helical band.

9. The interception missile according to claim 4, further comprising:
  an uplink for receiving commands from a control center;
  a proximity fuse operatively connected to the fragmentation warhead and configured for detonating the warhead at a predetermined spacing between the carrier vehicle and a flying object;
  wherein the interception missile is maneuverable at least responsive to receiving said commands.

10. The interception missile according to claim 9, wherein said uplink comprises a receiver for receiving data or signals relating to a predicted impact point (PIP) for the interception missile, target and carrier vehicle state vectors, and/or relative state vectors between target and carrier vehicle.

11. An interception system comprising:
  a missile battery including at least one interception missile for intercepting a flying object as defined in claim 9;
  a radar system for detecting and tracking at least one said flying object;
  a control center for determining a predicted impact point (PIP) for the missile;
  a communications uplink to provide maneuvering data to the interception missile during flight thereof to intercept the respective said flying object at the respective predicted interception point PIP.

12. A method for intercepting a flying object, the method comprising:
  (i) providing an interception missile as defined in claim 1;
  (ii) launching the interception missile along an intercept trajectory with respect to the flying object;
  (iii) maneuvering the carrier vehicle into proximity with the flying object;
  (iv) detecting the flying object within a minimum range with respect to the fragmentation warhead via the proximity fuse; and
  (v) detonating the explosive charge responsive to step (iv).

13. A fragmentation warhead configured for being mounted in a carrier vehicle, the fragmentation warhead having a longitudinal dimension along a longitudinal axis and configured for selectively providing a plurality of fragments directed towards a target area spaced at an interception spacing from said warhead to provide a fragmentation pattern on the target area including at least one set of said fragments in a spaced linear relationship extending to a length dimension greater than said longitudinal dimension, wherein adjacent said fragments in each said set at the target area are spaced at a respective fragmentation spacing that is within the dimensions of a kill zone of an intended target, wherein each said fragment is capable of neutralizing the intended target by impacting said kill zone;
  wherein the fragmentation warhead is configured for providing said plurality of fragments in the form of at least one set of serially adjacent said fragments in generally helical relationship with respect to a longitudinal axis of the fragmentation warhead.

14. The fragmentation warhead according to claim 13, wherein said kill zone has a length of 0.50 m and a width of 0.10 m.

15. The fragmentation warhead according to claim 13, wherein said flying object is any one of: a rocket, a GRAD rocket; a UAV, a manned air vehicle, or a cruise missile.

16. The fragmentation warhead according to claim 13, wherein the fragmentation warhead has a longitudinal axis and includes:
  a shell extending along said longitudinal axis and comprising a fixed shell portion and a fragmentation portion, and defining therebetween a cavity for accommodating therein an explosive charge;
  wherein the fragmentation portion includes said at least one set of serially adjacent fragments in correspondingly serially contiguous relationship in the fragmentation portion and in generally helical relationship with respect to the longitudinal axis.

17. The fragmentation warhead according to claim 16, wherein each said set of serially adjacent fragments in correspondingly serially contiguous relationship in said fragmentation portion and in generally helical relationship with respect to the longitudinal axis is oriented at predetermined helix angle with respect to said longitudinal axis.

18. The fragmentation warhead according to claim 17, wherein said helix angle is predetermined such that upon said detonation, the respective said fragments of each said set are spread over an imaginary cylindrical surface along a distance of between about 2 m to about 4 m over said cylindrical surface, at a corresponding radial distance of between 4 m and 8 m, respectively, from said longitudinal axis, while ensuring a spacing of not greater than 0.1 m between adjacent fragments at said radial distance.

19. The fragmentation warhead according to claim 16, wherein said fragmentation portion is formed as a plurality of axially serially adjacent fragmentation portion sections, each said fragmentation portion section comprising a plurality of said fragments in lateral contiguous relationship, and wherein said plurality of fragments of each successive said fragmentation portion section along said longitudinal axis is angularly displaced about the longitudinal axis with respect to the respective said plurality of fragments of the previous said fragmentation portion section.

20. The fragmentation warhead according to claim 16, wherein said fragmentation portion is formed as a generally helical band with respect to said longitudinal axis, and wherein said fixed shell portion comprises a generally helical slot complementary to said helical band.

* * * * *